(12) United States Patent
Schwab et al.

(10) Patent No.: US 11,750,280 B2
(45) Date of Patent: Sep. 5, 2023

(54) MILLIMETER WAVE REPEATER SYSTEMS AND METHODS

(71) Applicant: CommScope Technologies LLC, Hickory, NC (US)

(72) Inventors: Daniel Schwab, Gersthofen (DE); Felix Lübbers, Augsburg (DE); Joerg Stefanik, Donauworth (DE); Patrick Braun, Munningen (DE); Thomas Kummetz, Kissing (DE); Alfons Dussmann, Gansheim (DE); Klaus Uwe Rosenschild, Donauwörth (DE); Ahmed H. Hmimy, Richardson, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/167,739

(22) Filed: Feb. 4, 2021

(65) Prior Publication Data
US 2021/0328664 A1    Oct. 21, 2021

Related U.S. Application Data

(60) Provisional application No. 63/011,787, filed on Apr. 17, 2020.

(51) Int. Cl.
*H04L 27/00* (2006.01)
*H04B 7/204* (2006.01)
(Continued)

(52) U.S. Cl.
CPC ....... *H04B 7/2041* (2013.01); *H01Q 21/0025* (2013.01); *H04B 7/026* (2013.01); *H04B 7/2043* (2013.01)

(58) Field of Classification Search
CPC .... H04B 7/2041; H04B 7/026; H04B 7/2043; H04B 7/155; H01Q 21/0025
(Continued)

(56) References Cited

U.S. PATENT DOCUMENTS

| 10,608,729 B1 | 3/2020 | Youtz et al. |
| 2014/0066088 A1 | 3/2014 | Bhattacharya et al. |

(Continued)

OTHER PUBLICATIONS

International Searching Authority, "International Search Report and Written Opinion from PCT Application No. PCT/US2021/016600", from Foreign Counterpart to U.S. Appl. No. 17/167,739, filed May 24, 2021, pp. 1 through 11, Published: WO.

(Continued)

*Primary Examiner* — Tanmay K Shah
(74) *Attorney, Agent, or Firm* — Fogg & Powers LLC

(57) ABSTRACT

In one embodiment, an over-the-air millimeter wave repeater for a communications network comprises: a donor unit including a first plurality of modular electronic components and an access point including a second plurality of modular electronic components. The donor unit communicates downlink mmWave spectrum wireless signals received from a base station to the access point and radiates uplink mmWave spectrum wireless signals received from the access point to the base station. The access point radiates the downlink mmWave spectrum wireless signals received from the donor unit into a coverage area, receives the uplink mmWave spectrum wireless signals received from the coverage area, and communicates the uplink mmWave spectrum wireless signals to the donor unit. The first and second plurality of modular electronic components includes at least one of a modular antenna component, a modular signal conditioning component, a modular signal interface component, and a modular controller.

20 Claims, 14 Drawing Sheets

(51) Int. Cl.
    *H01Q 21/00* (2006.01)
    *H04B 7/026* (2017.01)
(58) Field of Classification Search
    USPC .......................................................... 375/262
    See application file for complete search history.

(56) References Cited

U.S. PATENT DOCUMENTS

| | | | |
|---|---|---|---|
| 2017/0208373 A1 | 7/2017 | Elder | |
| 2018/0288823 A1* | 10/2018 | Hampel | H04B 7/155 |
| 2019/0341995 A1 | 11/2019 | Ashworth et al. | |
| 2019/0356381 A1* | 11/2019 | Gharavi | H04W 52/245 |
| 2020/0403689 A1* | 12/2020 | Rofougaran | H04W 52/245 |
| 2021/0176670 A1* | 6/2021 | Keskitalo | H04W 24/08 |
| 2021/0306904 A1* | 9/2021 | Narasimha | H04B 7/155 |

OTHER PUBLICATIONS

Katherein, "Outlook on MWC 2019", Katherein USA, Feb. 24, 2019, pp. 1 through 6, https://web.archive.org/web/20200921113641/www.kathreinusa.com/outlook-on-mwc-2019/.

Pivotal Commware, "28 GHz Repeater with Holographic Beam Forming Technology", Pivotal 5G Echo Subscriber, at least as early as Jun. 4, 2019, pp. 1 through 6, Pivotal.

Pivotal Commware, "Holographic Beam Forming and Echo 5G Overview", Jul. 2019, pp. 1 through 20, Pivotal.

Schwab, David et al., "Coverage Enhancement for Distributed Antenna Systems and Repeaters by Time-Division Beamforming", U.S. Appl. No. 16/944,872, filed Jul. 31, 2020, pp. 1 through 39, Published: US.

\* cited by examiner

MILLIMETER WAVE REPEATER SYSTEMS AND METHODS

CROSS-REFERENCE TO RELATED APPLICATIONS

This patent application is a U.S. Patent Application claiming priority to, and the benefit of, U.S. Provisional Patent Application No. 63/011,787 titled "MILLIMETER WAVE REPEATER SYSTEMS AND METHODS" filed on Apr. 17, 2020, which is incorporated herein by reference in its entirety.

BACKGROUND

A centralized radio access network (C-RAN) can be used to implement base station functionality that is used to provide wireless service to items of user equipment (UE). Typically, for each cell implemented by a C-RAN, one or more baseband units (BBUs) interact with multiple remote units (RUs). Each BBU is coupled to the RUs over fronthaul communication links or a fronthaul network.

A major part of the fifth generation (5G) mobile communication standard is the utilization of the millimeter wave (mmWave) spectrum to transmit large signal bandwidths. Current mmWave transmitter deployments are typically operating in the frequency range between 24 GHz and 40 GHz and trials with frequencies up to 60 GHz are being executed. One benefit of these frequency bands is the huge amount of available bandwidth which enables very high data rates. However, the propagation conditions suffer drastically due to higher Free Space Loss (FSL) and increased penetration loss of materials compared to transmissions at lower frequencies. Repeater systems (such as distributed antenna systems or over-the-air repeaters) are often used to improve the coverage provided base stations by extending the coverage area provided, and for avoiding structures that contribute to penetration losses. However, to obtain the signal levels needed to establish the extended coverage at the high frequencies within the mmWave spectrum, repeater systems transmit the repeated signals at very high gain levels that tend to contribute to unwanted feedback and challenges due to limited isolation between the repeater's donor and coverage antennas. Moreover, conventional digital techniques that digitize communication signals before their retransmission so that digital filtering can be applied (to remove the undesired feedback components from the signal), are not effective at mmWave frequency signals because of the delays introduced by such processing and the resulting negative impact on group delay.

SUMMARY

In one embodiment, an over-the-air millimeter wave repeater for a communications network comprises: a repeater donor unit that includes a first plurality of modular electronic components; and a repeater access point coupled to the repeater donor unit, wherein the repeater access point includes a second plurality of modular electronic components; wherein the repeater donor unit communicates downlink millimeter wave spectrum wireless signals received from a base station to the repeater access point and radiates uplink millimeter wave spectrum wireless signals received from the repeater access point to the base station; wherein the access point radiates the downlink millimeter wave spectrum wireless signals received from the repeater donor unit into a coverage area, receives the uplink millimeter wave spectrum wireless signals received from the coverage area, and communicates the uplink millimeter wave spectrum wireless signals to the repeater donor unit; wherein the first plurality of modular electronic components includes at least one of a modular donor antenna component, a modular donor signal conditioning component, a modular donor signal interface component, and a modular donor controller; and wherein the second plurality of modular electronic components includes at least one of a modular coverage antenna component, a modular coverage signal conditioning component, a modular coverage signal interface component, and a modular coverage controller.

DRAWINGS

FIG. 1 is a block diagram illustrating and example communications network embodiment.

FIGS. 2, and 2A-2C are block diagrams illustrating example mmWave repeater embodiments.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
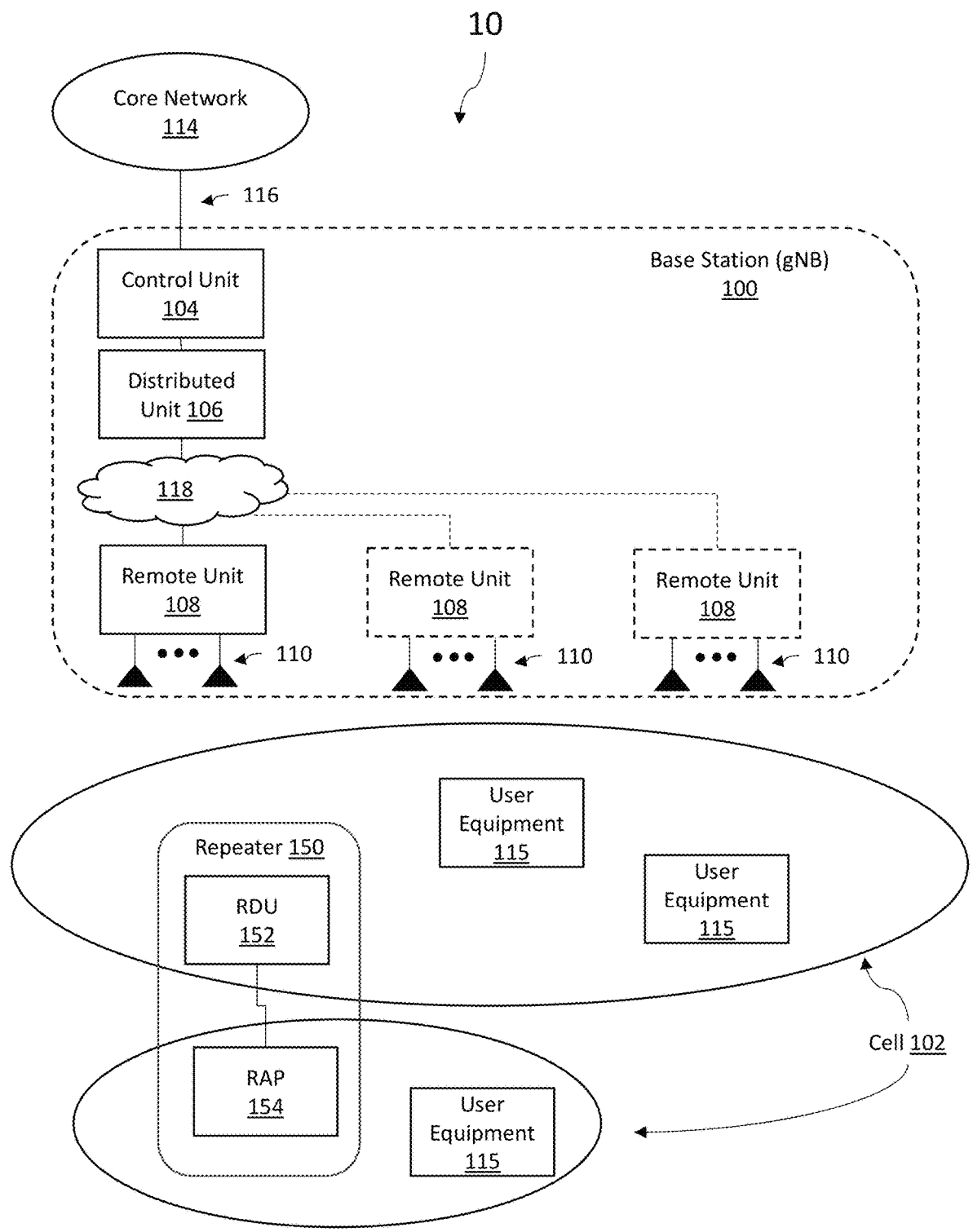

FIG. 1 is a block diagram illustrating one exemplary embodiment of a communications network 10 comprising a radio access network (RAN) system 100 and at least one over-the-air mmWave repeater 150. The RAN system 100 shown in FIG. 1 implements a base station. The RAN system 100 can also be referred to here as a "base station 100". The system 100 may also be referred to here as a "C-RAN system" 100. In the exemplary embodiment shown in FIG. 1, the base station 100 is implemented at least in part using a centralized or cloud RAN (C-RAN) architecture that employs, for each cell (or sector) 102 served by the base station 100, the following logical nodes: at least one control unit (CU) 104, at least one at least one distributed unit (DU) 106, and a remote unit (RU) 108. The RU 108 may be remotely located from the CU 104 and DU 106 serving it. As indicated in FIG. 1, it should be understood that for any of the embodiments described herein, the base station 100 may optionally comprise a plurality of RUs 108 as opposed to just a single RU 108. In that case, at least one of the RUs 108 may be remotely located from at least one other RU 108 serving that cell 102. Moreover, one or more over-the-air mmWave repeaters 150 may be provided to be used in conjunction with any of the multiple RUs 108 for those embodiments where the base station 100 comprises a plurality of RUs 108.

The base station 100 can be implemented in accordance with one or more public standards and specifications. In the exemplary embodiment described here in connection with FIG. 1, the Base station 100 is implemented using the logical RAN nodes, functional splits, and fronthaul interfaces defined by the O-RAN Alliance. In such an O-RAN example, each CU 104, DU 106, and RU 108 can be implemented as an O-RAN control unit (CU), O-RAN distributed unit (DU), and O-RAN remote unit (RU), respectively, in accordance with the O-RAN specifications. That is, each CU 104 comprises a logical node hosting Packet Data Convergence Protocol (PDCP), Radio Resource Control (RRC), Service Data Adaptation Protocol (SDAP), and other control functions. Each DU 106 comprises a logical node hosting Radio Link Control (RLC), and Media Access Control (MAC) layers as well as the upper or higher portion of the Physical (PHY) layer (where the PHY layer is split between the DU 106 and RU 108). Each RU 108 comprises a logical node hosting the portion of the PHY layer not implemented in the DU 106 (that is, the lower portion of the PHY layer) as well as implementing the basic RF and antenna functions.

Although the CU 104, DU 106, and RU 108 are described as separate logical entities, one or more of them can be implemented together using shared physical hardware and/or software. For example, in the exemplary embodiment shown in FIG. 1, for each cell 102, the CU 104 and DU 106 serving that cell 102 are physically implemented together using shared hardware and/or software, whereas RU 108 is physically implemented using separate hardware and/or software. Also, in the exemplary embodiment described here in connection with FIG. 1, the base station 100 can be implemented as a Fifth Generation New Radio (5G NR) RAN that supports a 5G NR wireless interface in accordance with the 5G NR specifications and protocols promulgated by the 3rd Generation Partnership Project (3GPP). Thus, in this embodiment, base station 100 can also be referred to as a "Next Generation Node B" 100 or "gNB" 100. Each RU 108 includes or is coupled to one or more antennas 110 via which downlink RF signals are radiated to various items of user equipment (UE) 115 and via which uplink RF signals transmitted by UEs 115 are received. In some embodiments, the RU 108 may comprise either 2, 4, 8 or 16 antennas 110 to support Multi-Input Multi-Output (MIMO) transmissions and/or beamforming.

The base station 100 is coupled to a core network 114 of the associated wireless network operator over an appropriate backhaul network 116 (such as an Internet Protocol(IP)/Ethernet managed network which may at least in part be owned by the network operator, or such as the Internet, for example). Also, each DU 106 can be communicatively coupled to the RU(s) 108 served by it using a fronthaul 118. Each of the DU 106 and RU 108 include one or more network interfaces (not shown) in order to enable the DU 106 and RU 108 to communicate over the fronthaul 118. In one implementation, the fronthaul 118 that communicatively couples the DU 106 to the RU 108 is implemented using a switched ETHERNET network. In such an implementation, each DU 106 and RU 108 includes one or more ETHERNET interfaces for communicating over the switched ETHER- NET network used for the fronthaul 118. However, it is to be understood that the fronthaul between each DU 106 and the RU 108 served by it can be implemented in other ways.

As noted above, in the exemplary embodiment described here in connection with FIG. 1, the Base station 100 is implemented as a 5G NR RAN that supports a 5G NR wireless interface to wirelessly communicate with the UEs 115. In the embodiment of FIG. 1, the coverage area provided by the cell 102 is expanded by an mmWave repeater 150. As shown in FIG. 1, the mmWave repeater 150 comprises at least a repeater donor unit (RDU) 152 and a repeater access point (RAP) 154. The repeater donor unit 152 functions to establish uplink (UL) and downlink (DL) connections with the base station within the millimeter waves (mmWave) band, which is also referred to as the Extremely High Frequency (EHF) band by the International Telecommunications Union (ITU). The repeater access point 154 functions to establish a connection with one or more mmWave UEs 115 within the millimeter waves band that might otherwise be outside of the coverage area of the cell 102, but which can now access the cell 102 through the repeater 150.

Each CU 104, DU 106, RU 108, RDU 152, RAP 154 as well as the base station 100 and repeater 150 more generally (and the functionality described as being included therein) and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. The base station 100 and repeater 150 more generally, can also be implemented in other ways.

In the exemplary embodiments described here in connection with FIG. 1, the mmWave repeater 150 may be implemented using modular components and provide for isolation enhancements that address feedback oscillations that can occur with repeaters due to the high gains used when operating at mmWave spectrum frequencies. Also as further described below, additional embodiments may be utilized to provide both deployment position and coverage zone localization as well as for repeater network adaption.

FIGS. 2, and 2A-2C illustrate an example mmWave repeater 150 embodiment which may be used in conjunction with the base station 100 as shown in FIG. 1 to extend the coverage area of a cell 102. Extension of a cell's coverage area by the mmWave repeater 150 may include an expansion of the geographic area covered by a cell over what the base station 100 can cover using just its own remote units 108, or include penetration into or around buildings or structures that the signals from the remote units 108 cannot reach without assistance, or a combination thereof.

Figure 2:
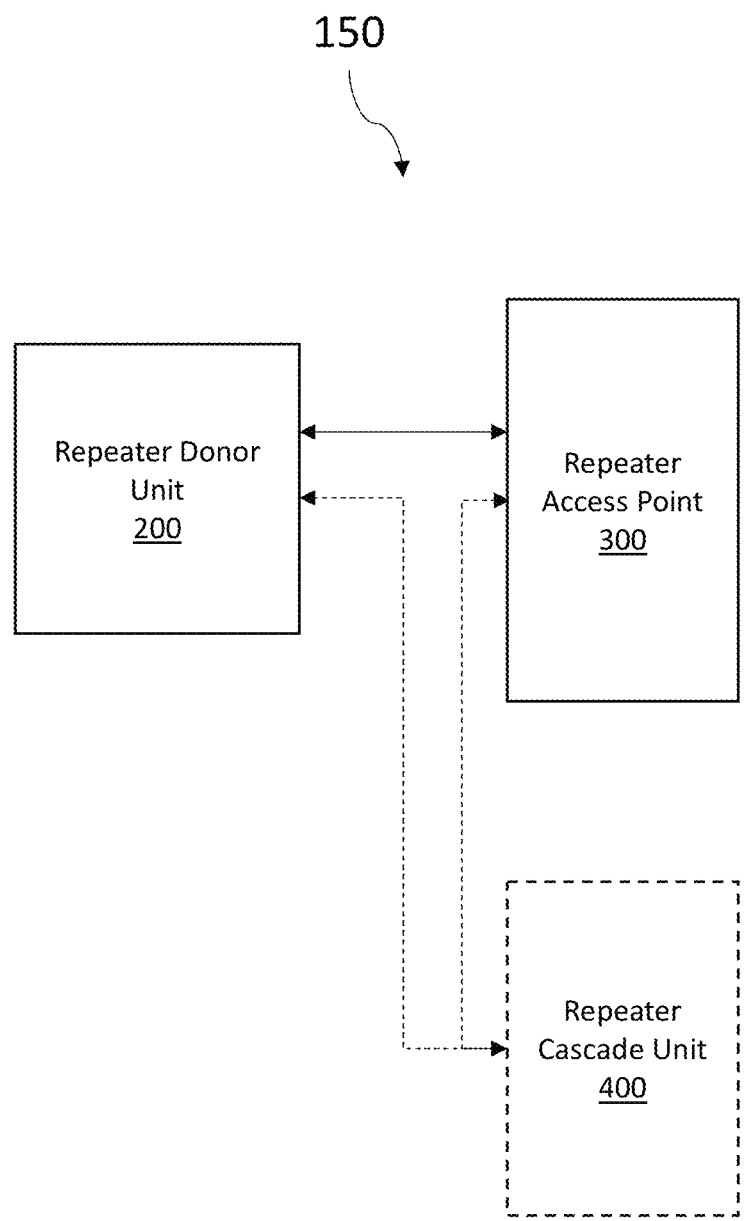

As shown in FIG. 2, a mmWave repeater 150 may comprise a repeater donor unit 200 (which may correspond to the repeater donor unit 152 of FIG. 1) and at least one repeater access point 300 (which may correspond to the radio access point 154). The mmWave repeater 150 may further comprise an optional repeater cascade unit 400 that may couple to either the repeater donor unit 200 or a repeater access point 300 of the mmWave repeater 150. The function and structure of a repeater cascade unit 400 is similar to that of a repeater access point 300 in the sense that it also forwards received uplink communications signals to the repeater donor unit 200 for retransmission upstream, and wirelessly retransmits downlink communication signals received from the repeater donor unit 200. The difference is that while the repeater access point 300 is intended to establish wireless communication links with UE 115 within the coverage area it creates, the repeater cascade unit 400 operates to establish a wireless communication link with another repeater 150 so as to establish a network of linked repeaters. For example, FIGS. 4, 5, and 9 each illustrate example embodiments where multiple repeaters are linked in a cascading architecture to form a network of repeaters 150 where each repeater 150 may retransmit uplink and downlink communication signals to and from other repeaters 150. In some embodiments, a repeater 150 in a cascading architecture may communicate with other repeaters 150 in addition to, or instead of, directly communicating with the UE 115.

In the embodiments shown in FIGS. 2A-2C and 3, the repeater donor unit 200, the repeater access point 300, and the optional repeater cascade unit 400, may each be implemented by combining together a plurality of modular hardware components, each modular component providing a different functionality to the repeater 150. As the term is used herein, a "modular" component, (including "modular" interfaces and "modular" controllers) refers to a self-contained component of hardware comprising electronics and circuits that form a subsystem that performs a designated function in conjunction with the elements of the larger repeater system into which it is installed. In some embodiments, these modular components may be readily installed and removed in order to provide the repeater 150 with a desired operational configuration, or for maintenance purposes. The modularity of the repeater donor unit 200, repeater access point 300, and repeater cascade unit 400, thus provide a degree of flexibility in deploying a mmWave repeater 150 for various different use-cases.

Figure 2A:
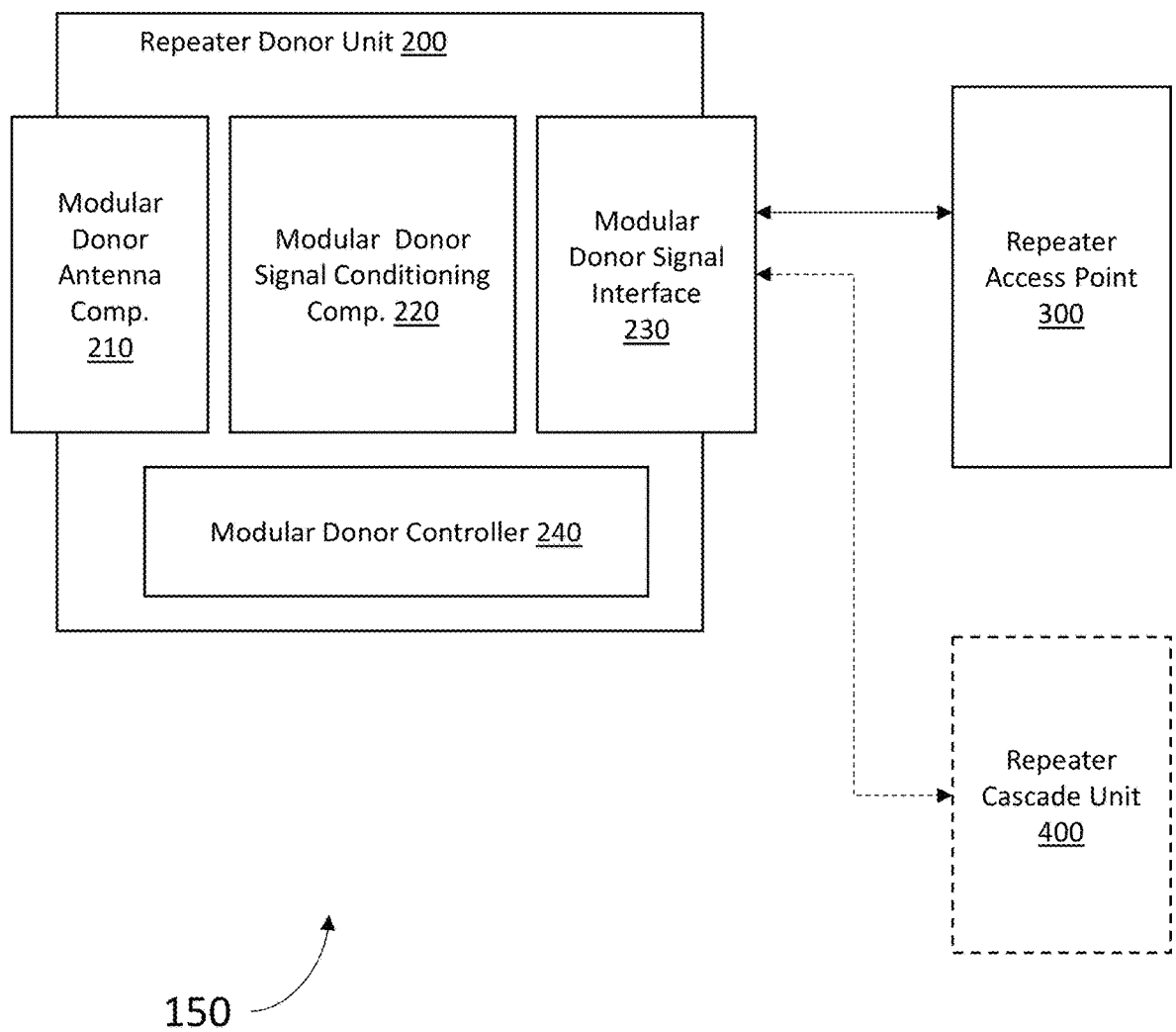

In FIG. 2A, the repeater donor unit 200 is shown at comprising a modular donor antenna component 210, a modular donor signal conditioning component 220, a modular donor signal interface 230, and a modular donor controller 240. In other embodiments, a repeater donor unit 200 may comprise one or more of any of these modular components. In some embodiments, a modular donor signal conditioning component 220 may serve as a motherboard or backplane to which one or more of the modular donor antenna components 210, the modular donor signal interface 230, and/or the modular donor controller 240 are installed to provide electrical power to, and signal communication between, the other components.

The modular donor antenna component 210 radiates and receives mmWave spectrum wireless signals to establish a wireless communication link with the base station 100. The modular donor antenna component 210 receives downlink communication signals from the base station 100 for retransmission by a repeater access point 300 to user equipment (UE) 115. The modular donor antenna component 210 transmits uplink communication signals received by the repeater access point 300 from the UE 115 to the base station 100. A modular donor antenna component 210 may be selected from a plurality of different modular donor antenna components 210 with different antenna characteristics for installation into the repeater donor unit 200. For example, a modular donor antenna component 210 may be selected based on a combination of what radiation pattern and antenna gain are provided. The modular donor antenna component 210 may therefore be selected based on existing conditions in the field at the repeater 150 installation location and which combination of radiation pattern and antenna gain provides the best uplink and downlink signal quality with the base station 100 or upstream repeater cascade unit 400. The metric used for determining uplink and downlink signal quality for any of the embodiments disclosed herein may include, for example, measurements of signal power, signal-to-noise ratio, or measurements of other signal quality parameters.

In some embodiments, a modular donor antenna component 210 may comprise an array of multiple, spatially separated antennas so that the directionality of the modular donor antenna component 210 main lobe (and/or side or back lobes as further discussed below) can be adjusted in the field at the time of the repeater 150 deployment. For example, in some embodiments the directionality of the modular donor antenna component 210 antenna array is controlled by adjusting the phase and relative amplitude of the signal transmitted from each of the spatially separated antennas of the array in order to create a pattern of constructive and destructive interference in the wave front. Such adjustments may be performed manually by a technician in the field. In some embodiments, the directionality of the modular donor antenna component 210 antenna array may be controlled by phase and relative amplitude adjustments controlled by the modular donor controller 240. Such adjustments can be used for both downlink and uplink antenna directionality. In alternate embodiments, the phase and relative amplitude of the signal transmitted from each of the spatially separated antennas of the array can be implemented in an analog manner (for example, by applying the phase and relative amplitude weights in the RF front end circuitry with the modular donor signal conditioning component 220), in a digital manner (for example, by applying the phase and relative amplitude weights to frequency domain data within the modular donor signal conditioning component 220), or through a combination of analog and digital techniques.

The modular donor signal conditioning component 220 comprises an uplink path and downlink path for transporting communications between the modular donor antenna component 210 and the modular donor signal interface 230 within specified frequency bands and channels. The uplink path and downlink path are coupled to the modular donor antenna component 210. As such, the downlink path may include front end circuitry for processing radio frequency signals received by the modular donor antenna component 210 (including low noise amplifiers, filters, and other circuitry) compatible with frequency bands and signals transmitted by the base station 100 and UE 115. Similarly, the uplink path may include front end circuitry for processing radio frequency signals to be radiated by the modular donor antenna component 210 (including power amplifiers, filters, and other circuitry) compatible with frequency bands and signals received by the base station 100. As such, the modular donor signal conditioning component 220 for a specific repeater deployment may be selected based on RF and/or other characteristics of the communication signals that will be retransmitted by the repeater 150.

The modular donor signal interface 230 provides the interface for coupling the repeater donor unit 200 to one or more repeater access points 300 and optionally one or more repeater cascade units 400. For example, in some embodiments, the modular donor signal interface 230 is coupled to the uplink and downlink signal paths of the modular donor signal conditioning component 220 and includes ports and/or circuitry to facilitate transport of communication signals within the repeater 150 with the repeater access point(s) 300 and repeater cascade unit(s) 400, for example, using coaxial cable, fiber optics, or other wired or wireless medium. For example, if a repeater access point 300 is physically installed at a location near the repeater donor unit 200, a technician may install a modular donor signal interface 230 into the repeater donor unit 200 that has connectors and electronics to support a coaxial cable connection to the repeater access point 300. Alternatively, if the purpose of the repeater 150 is to provide for better signal penetration into a building, or into a location several meters away from the repeater donor unit 200, a technician may install a modular donor signal interface 230 into the repeater donor unit 200 that has connectors and electronics to support a fiber optic cable connection to the repeater access point 300.

The modular donor controller 240 provides the management, monitoring, and control of the various aspects of the repeater donor unit 200 and its component modules described herein. In some embodiments, the modular donor controller 240 may comprise a processor coupled to a memory that executes one or more repeater management and control software applications. In some embodiments the modular donor controller 240 may include a modem or network interface that permits remote user access to the functions of the modular controller from via an external network. For example, in some embodiments, the modular donor controller 240 may include circuitry to implement a Global Navigation Satellite System (GNSS) module (a Global Positioning System (GPS) receiver, for example), a Bluetooth Low Energy (BLE) transceiver module, a wireless network module (such as a WiFi module, for example), or other transceivers or sensors, in order to obtain repeater configuration information and/or access, operate and maintain the repeater 150.

Figure 2B:
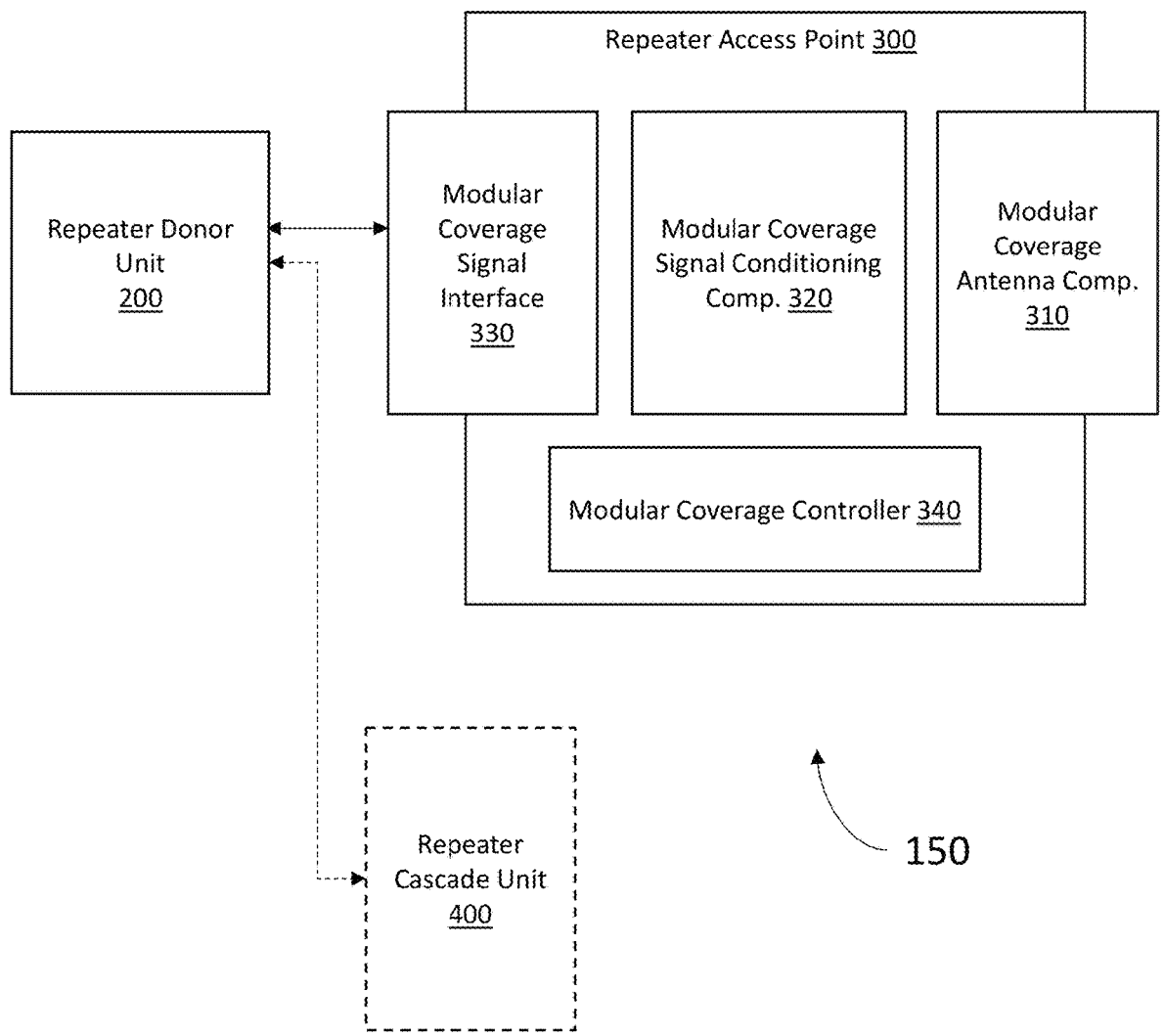

In FIG. 2B, a repeater access point 300 is shown as comprising a modular coverage antenna component 310, a modular coverage signal conditioning component 320, a modular coverage signal interface 330, and a modular coverage controller 340. In other embodiments, a repeater access point 300 may comprise one or more of any of these modular components. In some embodiments, a modular coverage signal conditioning component 320 may serve as a motherboard or backplane to which one or more of the modular coverage antenna component 310, the modular coverage signal interface 330, and/or the modular coverage controller 340 are installed to provide electrical power to, and signal communication between, the other components.

The modular coverage antenna component 310 radiates and receives wireless signals to establish a wireless communication link between the repeater access point 300 and one or more UE 115 devices within its coverage area. The modular coverage antenna component 310 receives uplink communication signals from the UE 115 devices which are to be retransmitted by the repeater donor unit 200 to the base station 100. The modular coverage antenna component 310 transmits to the UE 115 devices downlink communication signals received by the repeater access point 300 from the repeater donor unit 200. A modular coverage antenna component 310 may be selected from a plurality of different modular coverage antenna components 310 with different antenna characteristics for installation into the repeater access point 300. For example, a modular coverage antenna component 310 may be selected based on a combination of what radiation pattern and antenna gain are provided.

The modular coverage antenna component 310 may therefore be selected based on existing conditions in the field at the installation location and which combination of radiation pattern and antenna gain provides the best uplink and downlink signal quality with UE 115 within a desired coverage area. The metric used for determining uplink and downlink signal quality may include, for example, measurements of signal power, signal-to-noise ratio, or measurements of other signal quality parameters.

In some embodiments, a modular coverage antenna component 310 may comprise an array of multiple, spatially separated antennas so that the directionality of the modular coverage antenna component 310 main lobe (and/or side or back lobes as further discussed below) can be adjusted in the field at the time of the repeater 150 deployment. For example, in some embodiments the directionality of the modular coverage antenna component 310 antenna array can be controlled by adjusting the phase and relative amplitude of the signal transmitted from each of the spatially separated antennas of the array in order to create a pattern of constructive and destructive interference in the wave front. Such adjustments may be performed manually by a technician in the field. In some embodiments, the directionality of the modular coverage antenna component 310 antenna array may be controlled by phase and relative amplitude adjustments controlled by the modular coverage controller 340. Such adjustments can be used to affect adjustments in both the downlink and uplink antenna directionality. In alternate embodiments, the phase and relative amplitude of the signal transmitted from each of the spatially separated antennas of the array can be implemented in an analog manner (for example, by applying the phase and relative amplitude weights in the RF front end circuitry within the modular coverage signal conditioning component 320), in a digital manner (for example, by applying the phase and relative amplitude weights to the frequency domain data within the modular coverage signal conditioning component 320), or a combination of analog and digital techniques.

The modular coverage signal conditioning component 320 comprises an uplink path and downlink path for transporting communications between the modular coverage antenna component 310 and the modular coverage signal interface 330 within specified frequency bands and channels. The uplink path and downlink path are coupled to the modular coverage antenna component 310. As such, the uplink path may include front end circuitry for processing radio frequency signals received by the modular coverage antenna component 310 (including low noise amplifiers, filters, and other circuitry) compatible with frequency bands and signals transmitted by the UE 115 and base station 100. Similarly, the downlink path may include front end circuitry for processing radio frequency signals to be radiated by the modular coverage antenna component 310 (including power amplifiers, filters, and other circuitry) compatible with frequency bands and signals received by the base station 100 and UE 115. As such, the modular coverage signal conditioning component 320 for a specific repeater deployment may be selected based on RF and/or other characteristics of the communication signals that will be retransmitted by the repeater 150.

The modular coverage signal interface 330 provides the interface for coupling the repeater access point 300 to the repeater donor unit 200 and optionally one or more repeater cascade units 400. For example, in some embodiments, the modular coverage signal interface 330 is coupled to the uplink and downlink signal paths of the modular coverage signal conditioning component 320 and includes ports and/or circuitry to facilitate transport of communication signals within the repeater 150 with the repeater donor unit 200 and optional repeater cascade unit(s) 400, for example, using coaxial cable, fiber optics, or other wired or wireless medium. For example, if a repeater access point 300 is physically installed at a location near the repeater donor unit 200, a technician may install a modular coverage signal interface 330 into the repeater access point 300 that has connectors and electronics to support a coaxial cable connection to the repeater donor unit 200. Alternatively, if the purpose of the repeater 150 is to provide for better signal penetration into a building, or into a location several meters away from the repeater donor unit 200, a technician may install a modular coverage signal interface 330 into the repeater access point 300 that has connectors and electronics to support a fiber optic cable connection to the repeater donor unit 200.

The modular coverage controller 340 provides the management, monitoring, and control of the various aspects of the repeater access point 300 and its component modules described herein. In some embodiments, the modular coverage controller 340 may comprise a processor coupled to a memory that executes one or more repeater management and control software applications. In some embodiments the modular coverage controller 340 may include a modem or network interface that permits remote user access to the functions of the modular controller from via an external network. For example, in some embodiments, the modular coverage controller 340 may include circuitry to implement a GNSS module (a GPS receiver, for example), a BLE transceiver module, a wireless network module (such as a WiFi module, for example), or other transceivers or sensors, in order to obtain repeater configuration information and/or access, operate and maintain the repeater 150. It should be appreciated that in some embodiments, a repeater 150 may instead comprise single modular controller that incorporates the functions described herein for both the modular donor controller 240 and the modular coverage controller 340. In such embodiments, the single modular controller may be housed in either the repeat donor unit 200 or the repeater access point 300. Such a shared modular controller may interface with the corresponding signal conditioning component, motherboard and/or backplane as described above.

Figure 2C:
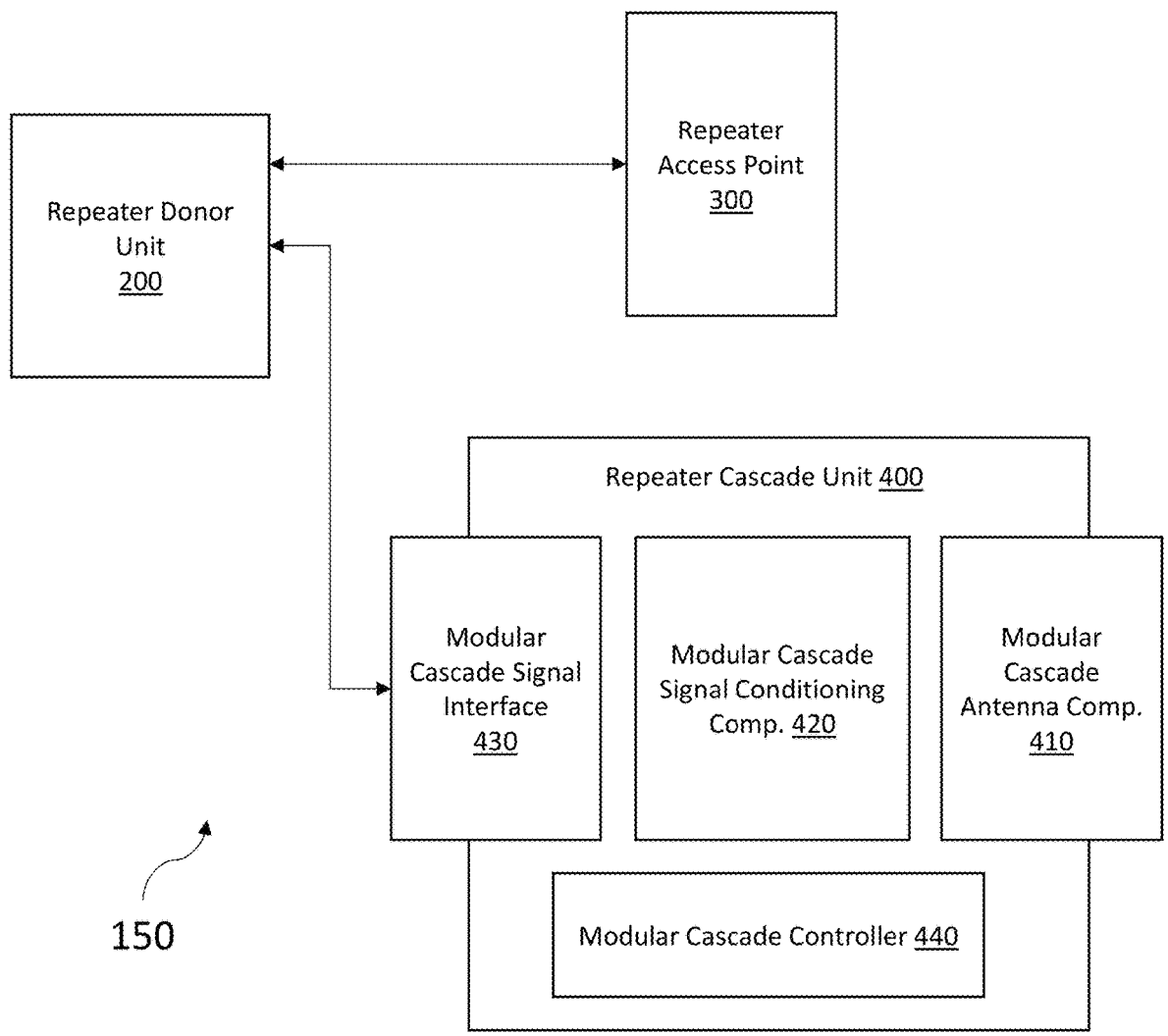

In FIG. 2C, a repeater cascade unit 400 is shown as comprising a modular cascade antenna component 410, a modular cascade signal conditioning component 420, a modular cascade signal interface 430, and a modular cascade controller 440. In other embodiments, a repeater cascade unit 400 may comprise one or more of any of these modular components. In some embodiments, a modular cascade signal conditioning component 420 may serve as a motherboard or backplane to which one or more of the modular cascade antenna components 410, the modular cascade signal interface 430, and/or the modular cascade controller 440 are installed to provide electrical power to, and signal communication between, the other components. These components of the repeater cascade unit 400 function in essentially the same manner describe above for the corresponding components of the repeater access point 300.

The modular cascade antenna component 410 radiates and receives wireless signals to establish a wireless communication link between the repeater cascade unit 400 and another repeater 150 within its coverage area.

The modular cascade antenna component 410 receives uplink communication signals from the other repeater 150 which are to be retransmitted by the repeater donor unit 200 to the base station 100. The modular cascade antenna component 410 transmits to the other repeater 150 downlink communication signals received by the repeater cascade unit 400 from the repeater donor unit 200. In alternate embodiments, the repeater cascade unit 400 may be coupled directly to the repeater donor unit 200, or alternately indirectly through a repeater access point 300. A modular cascade antenna component 410 may be selected from a plurality of different modular cascade antenna components 410 with different antenna characteristics for installation into the repeater cascade unit 400. For example, a modular cascade antenna component 410 may be selected based on a combination of what radiation pattern and antenna gain are provided.

The modular cascade antenna component 410 may therefore be selected based on existing conditions in the field at the installation location and which combination of radiation pattern and antenna gain provides the best uplink and downlink signal quality with the downstream other repeater 150. The metric used for determining uplink and downlink signal quality may include, for example, measurements of signal power, signal-to-noise ratio, or measurements of other signal quality parameters.

In some embodiments, a modular cascade antenna component 410 may comprise an array of multiple, spatially separated antennas so that the directionality of the modular cascade antenna component 410 main lobe (and/or side or back lobes as further discussed below) can be adjusted in the field at the time of the repeater 150 deployment. For example, in some embodiments the directionality of the modular cascade antenna component 410 antenna array can be controlled by adjusting the phase and relative amplitude of the signal transmitted from each of the spatially separated antennas of the array in order to create a pattern of constructive and destructive interference in the wave front. Such adjustments may be performed manually by a technician in the field. In some embodiments, the directionality of the modular cascade antenna component 410 antenna array may be controlled by phase and relative amplitude adjustments controlled by the modular cascade controller 440. Such adjustments can be used to affect adjustments in both the downlink and uplink antenna directionality. In alternate embodiments, the phase and relative amplitude of the signal transmitted from each of the spatially separated antennas of the array can be implemented in an analog manner (for example, by applying the phase and relative amplitude weights in the RF front end circuitry within the modular cascade signal conditioning component 420), in a digital manner (for example, by applying the phase and relative amplitude weights to the frequency domain data within the modular cascade signal conditioning component 420), or a combination of analog and digital techniques.

The modular cascade signal conditioning component 420 comprises an uplink path and downlink path for transporting communications between the modular cascade antenna component 410 and the modular cascade signal interface 430 within specified frequency bands and channels. The uplink path and downlink path are coupled to the modular cascade antenna component 410. As such, the uplink path may include front end circuitry for processing radio frequency signals received by the modular cascade antenna component 410 (including low noise amplifiers, filters, and other circuitry) compatible with frequency bands and signals transmitted by the UE 115 and base station 100. Similarly, the downlink path may include front end circuitry for processing radio frequency signals to be radiated by the modular cascade antenna component 410 (including power amplifiers, filters, and other circuitry) compatible with frequency bands and signals received by the base station 100 and UE 115. As such, the modular cascade signal conditioning component 420 for a specific repeater deployment may be selected based on RF and/or other characteristics of the communication signals that will be retransmitted by the repeater 150.

The modular cascade signal interface 430 provides the interface for coupling the repeater cascade unit 400 to a repeater donor unit 200 or optionally to a repeater access point 300. For example, in some embodiments, the modular cascade signal interface 430 is coupled to the uplink and downlink signal paths of the modular cascade signal conditioning component 420 and includes ports and/or circuitry to facilitate transport of communication signals within the repeater 150 with the repeater donor unit 200 (or repeater access point 300), for example, using coaxial cable, fiber optics, or other wired or wireless medium. For example, if a repeater cascade unit 400 is physically installed at a location near the repeater donor unit 200, a technician may install a modular cascade signal interface 430 into the repeater cascade unit 400 that has connectors and electronics to support a coaxial cable connection to the repeater donor unit 200. Alternatively, if the purpose of the repeater 150 is to provide a better signal penetration into a building, or into a location several meters away from the repeater donor unit 200, a technician may install a modular cascade signal interface 430 into the repeater cascade unit 400 that has connectors and electronics to support a fiber optic cable connection to the repeater donor unit 200.

The modular cascade controller 440 provides the management, monitoring, and control of the various aspects of the repeater cascade unit 400 and its component modules described herein. In some embodiments, the modular cascade controller 440 may comprise a processor coupled to a memory that executes one or more repeater management and control software applications. In some embodiments the modular cascade controller 440 may include a modem or network interface that permits remote user access to the functions of the modular controller from via an external network. For example, in some embodiments, the modular cascade controller 440 may include circuitry to implement a GNSS module (a GPS receiver, for example), a BLE transceiver module, a wireless network module (such as a WiFi module, for example), or other transceivers or sensors, in order to obtain repeater configuration information and/or access, operate and maintain the repeater 150. It should be appreciated that for those repeater 150 embodiments that do comprise a repeater cascade unit 400, the repeater 150 may instead comprise single modular controller that incorporates the functions described herein for both the modular donor controller 240, the modular coverage controller 340 and/or the modular cascade controller 440. In such embodiments, the single modular controller may be housed in either the repeat donor unit 200, the repeater access point 300, or the repeater cascade unit 400. Such a shared modular controller may interface with the corresponding signal conditioning component, motherboard and/or backplane as described above.

With the given modularity of the repeater donor unit 200, repeater access point 300, and repeater cascade unit 400, it is possible to decide short-term which solution fits best to the given scenario at a repeater 150 deployment location. This is benefit for the installer and repeater operator in terms of stock logistics as any system variant can be configured easily.

Figure 3A:
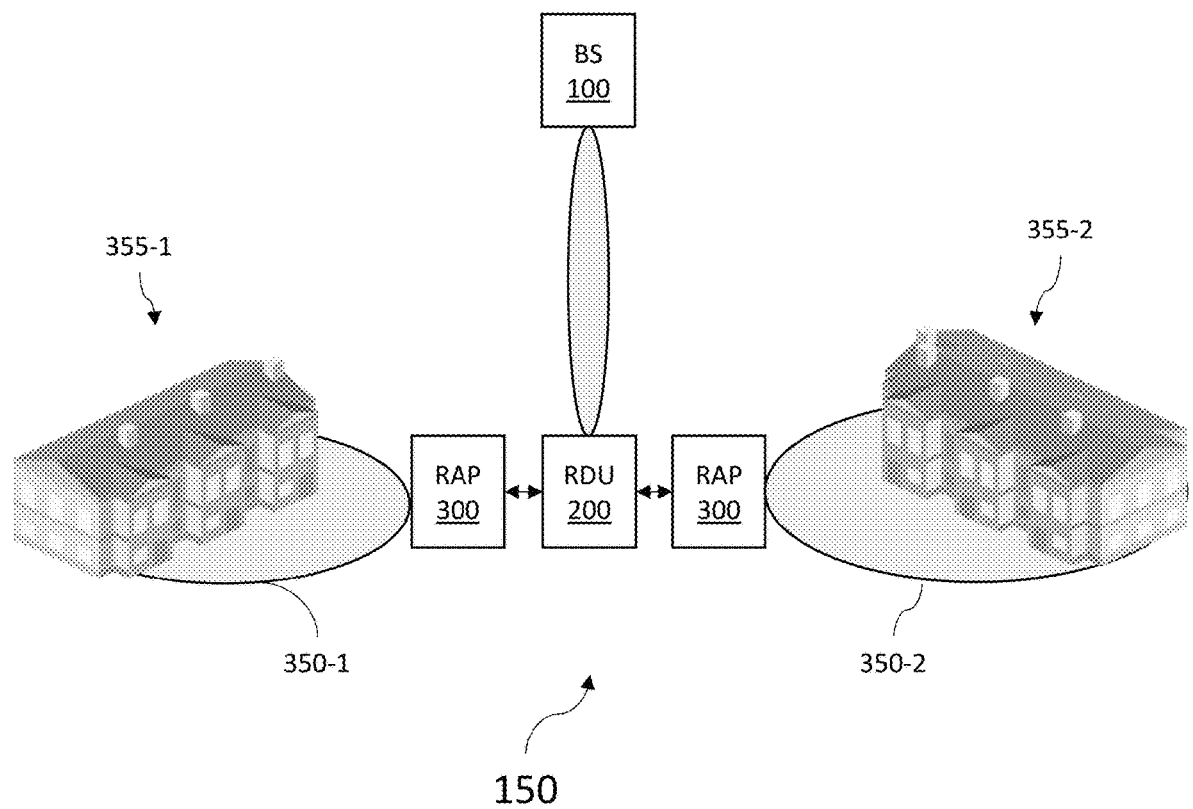
FIGS. 3A and 3B are block diagrams illustrating example mmWave repeater embodiment.
Figure 3B:
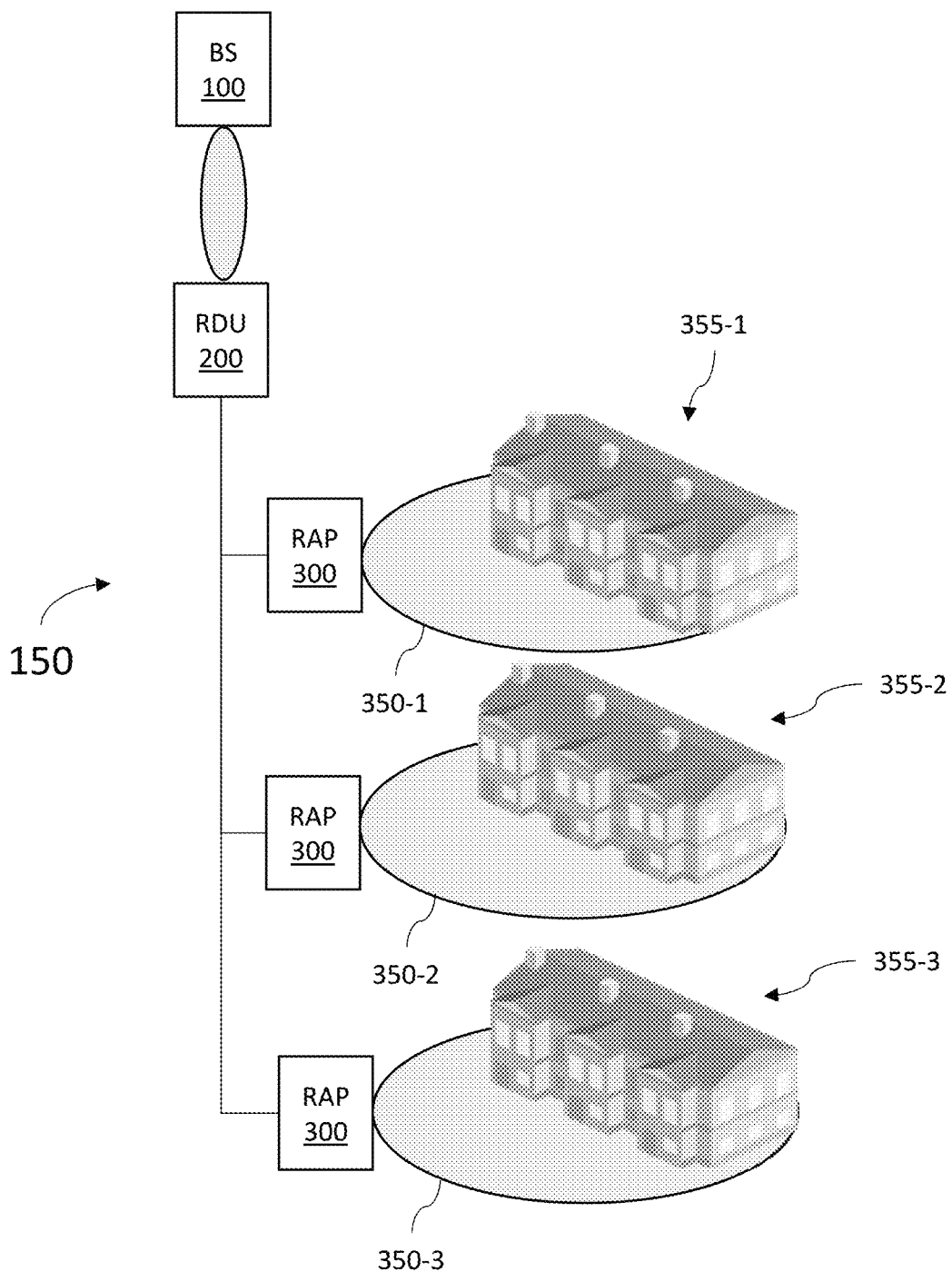

FIGS. 3A and 3B illustrate two example variant implementations of a repeater 150 comprising a repeater donor unit 200 and multiple repeater access points 300 and 300. In the embodiments shown in FIGS. 3A and 3B, the repeater access points 300 are each coupled to a repeater donor unit 200 and include modular coverage antenna components 310 selected for having a directionality and gain that creates a coverage area using antenna patterns narrowly directed to specific customer premises. For example, the embodiment of 3A illustrates an implementation where the repeater access points 300 include modular coverage antenna components 310 selected for having a directionality and gain that creates the distinct coverage areas 350-1 and 350-2 for the respective customer premises 355-1 and 355-2. Here, the repeater access points 300 may be located near the repeater donor unit 200, for example on a common pole, frame or other structure. Because of their proximity, coaxial cable may be utilized to carry communications signals between the repeater access points 300 and repeater donor unit 200, and all of the components of the repeater 150 may be powered from the same local electrical power source. The embodiment of 3B illustrates an implementation where the repeater access points 300 include modular coverage antenna components 310 selected for having a directionality and gain that creates the distinct coverage areas 350-1, 350-2 and 350-3 for the respective customer premises 355-1, 355-2 and 355-3. The embodiment of 3B also illustrates an implementation where the repeater access points 300 may be located remote from the repeater donor unit 200, for example on different poles, frames or other structures. Because of their distance from each other, fiber optic cables may be utilized to carry communications signals between the repeater access points 300 and repeater donor unit 200. The components of the repeater 150 may each be powered from respective local electrical power sources proximate to their location, or in some embodiments, hybrid fiber and power cables may be utilized to distribute power from the repeater donor unit 200 to the repeater access points 300.

Figure 4:
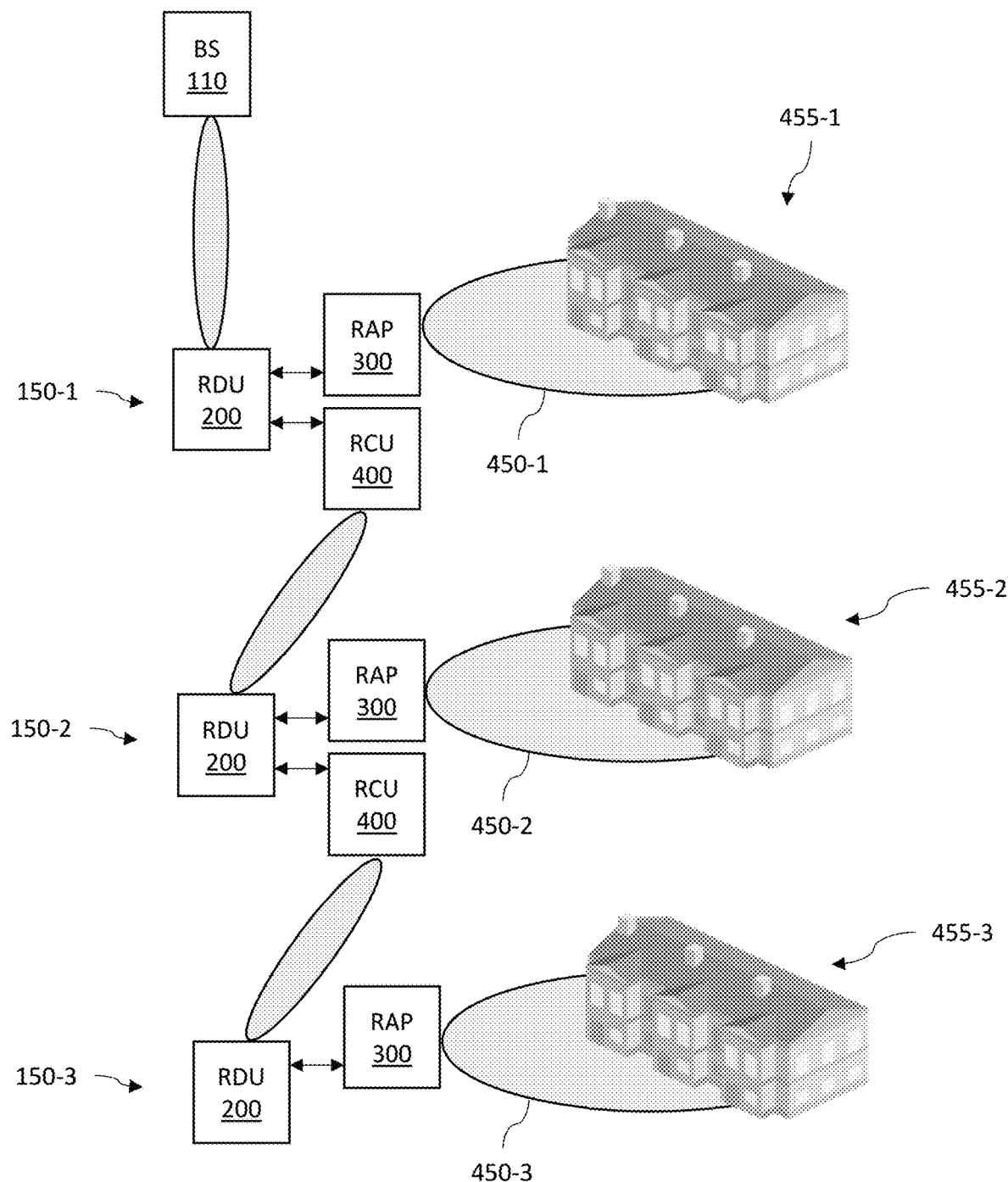
FIGS. 4 and 5 are block diagrams illustrating example cascading mmWave repeater network embodiments.

FIG. 4 illustrates an example implementation comprising a cascading architecture that includes multiple repeaters 150 to establish multiple coverage areas 350-1 and 350-2. In the embodiment of FIG. 4, a first repeater 150-1 includes a repeater donor unit 200 coupled to a repeater access point 300 and further coupled to a repeater cascade unit 400. The repeater donor unit 200 of the first repeater 150-1 includes modular donor antenna component 210 selected for having a directionality and gain that optimizes communication with the base station 100. The repeater access point 300 of repeater 150-1 includes a modular coverage antenna component 310 selected for having a directionality and gain that creates the coverage area 450-1 using antenna patterns narrowly directed to specific customer premises 455-1. The repeater cascade unit 400 of repeater 150-1 includes a modular cascade antenna component 410 selected for having a directionality and gain directed to the next repeater of the chain, the second repeater 150-2.

The second repeater 150-2 includes a repeater donor unit 200 that has a modular donor antenna component 210 selected for having a directionality and gain that optimizes communication with the repeater cascade unit 400 of repeater 150-1. The repeater donor unit 200 is coupled to a repeater access point 300 and further coupled to a repeater cascade unit 400. The repeater access point 300 of repeater 150-2 includes a modular coverage antenna component 310 selected for having a directionality and gain that creates the coverage area 450-2 using antenna patterns narrowly directed to specific customer premises 455-2. The repeater cascade unit 400 of repeater 150-2 includes a modular cascade antenna component 410 selected for having a directionality and gain directed to the next repeater of the chain, the third repeater 150-3.

The third repeater 150-3 includes a repeater donor unit 200 that has a modular donor antenna component 210 selected for having a directionality and gain that optimizes communication with the repeater cascade unit 400 of repeater 150-2. The repeater donor unit 200 of repeater 150-3 is also coupled to a repeater access point 300 that includes a modular coverage antenna component 310 selected for having a directionality and gain that creates the coverage area 450-3 using antenna patterns narrowly directed to specific customer premises 455-3. The third repeater 150-3, being the end repeater in the cascading chain, need not include a repeater cascade unit 400, though it may include one for future expansion purposes.

In this way, the coverage area of the cell 102 associated with base station 100 is expanded to cover customer premises 455-1, 2 and 3. Although this example illustrates a cascading network of three repeaters, it should be understood that in other embodiments a cascading network may include any number of 2 or more repeaters.

Figure 5:
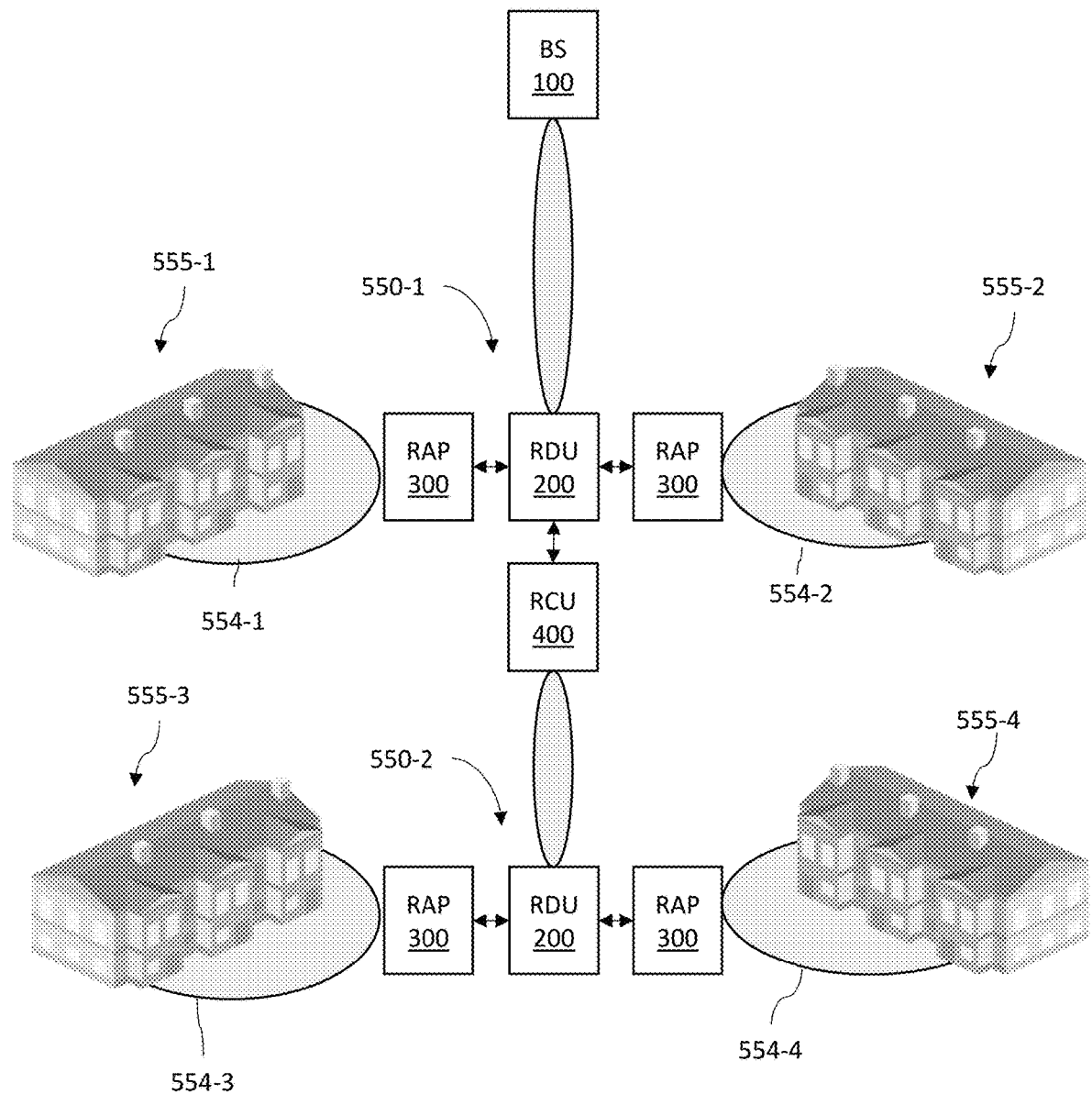

FIG. 5 illustrates an example implementation comprising a cascading architecture that includes multiple repeaters 150, where one or more of the multiple repeaters 150 comprise multiple repeater access points 300. A first repeater 550-1 includes a repeater donor unit 200 coupled to a pair of repeater access points 300 and further coupled to a repeater cascade unit 400. In FIG. 5, the repeater donor unit 200 of the first repeater 550-1 includes modular donor antenna component 210 selected for having a directionality and gain that optimizes communication with the base station 100. The repeater access points 300 of repeater 550-1 are each coupled to the repeater donor unit 200 of repeater 550-1 and include modular coverage antenna components 310 selected for having a directionality and gain that creates coverage areas 554-1 and 554-2 using antenna patterns narrowly directed to specific customer premises 555-1 and 555-2. The repeater cascade unit 400 of repeater 550-1 includes a modular cascade antenna component 410 selected for having a directionality and gain directed to the next repeater of the chain, the second repeater 550-2.

The second repeater 550-2 includes a repeater donor unit 200 that has a modular donor antenna component 210 selected for having a directionality and gain that optimizes communication with the repeater cascade unit 400 of repeater 550-1. The repeater access points 300 of repeater 550-2 are each coupled to the repeater donor unit 200 of repeater 550-2 and include modular coverage antenna components 310 selected for having a directionality and gain that creates coverage areas 554-3 and 554-4 using antenna patterns narrowly directed to specific customer premises 555-3 and 555-4.

Various embodiments of mmWave repeaters 150 may therefore be used in various combinations with antenna component configuration having directionality and gain patterns to create tailored coverage areas to feed signals around building, bypass walls, or circumvent other signal blocking obstacles.

As discussed above, to compensate for the poor propagation characteristics of mmWave frequencies, high gain values are used by mmWave repeater system. However, transmitting signals with high gain increase the tendency of system oscillation where the isolation between the donor and coverage antennas of a repeater is not sufficiently high. In the case of downlink signal retransmissions by a repeater, without sufficient isolation, high gain (e.g. high RF power) transmission by a coverage antenna can be received back into the repeater's donor antenna and into its downlink signal path where it becomes superimposed on the desired downlink signals received at the donor antenna from the base station 100. This superposition of previously transmitted downlink signals and original base station signals can result in oscillations within the downlink signal path that degrade the quality of signals received by the UE 115. It should be noted, however, that this form of feedback is not limited to just affecting downlink signals. In the case of uplink signal retransmissions by a repeater, without sufficient isolation high gain (e.g. high RF power) transmission by a donor antenna can similarly be received back into the repeater's coverage antenna and into its uplink signal path where it becomes superimposed on the desired uplink signals received at the coverage antenna from UE 115. This superposition of previously transmitted downlink signals and original base station signals can degrade the quality of signals received by the UE 115. Similarly, superposition of previously transmitted uplink signals and uplink signals from the UE 115 can degrade the quality of signals received by the base station 100. It should also be noted that in both the uplink and downlink signal paths, oscillations can be produced even in the absence of communication signal by thermal noise being amplified, transmitted and received by the repeater 150.

Figure 6:
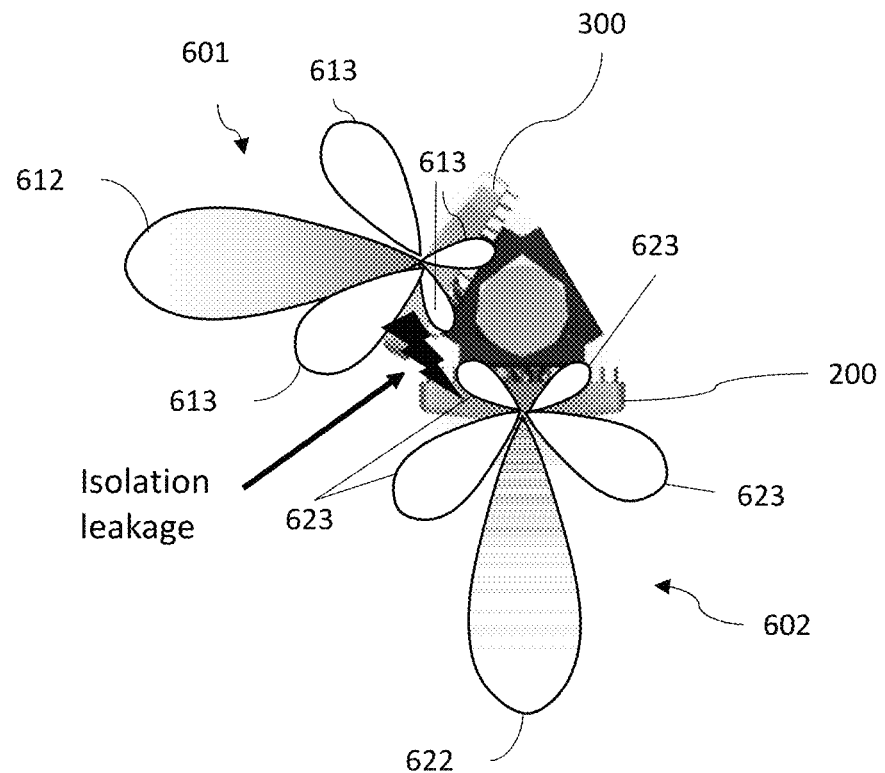
FIG. 6 is a diagram illustrating an example embodiment of isolation leakage reducing.

In order to control and improve missing isolation, one or more embodiments of the mmWave repeater 150 may employ what is referred to herein as hybrid sidelobe mitigation. As depicted in FIG. 6, the radiation pattern 601 associated with a repeater access point 300 (that is, radiation pattern produced by its modular coverage antenna component 310) will include a main lobe 612 (or main beam) and a plurality of sidelobes 613. The radiation pattern 602 associated with a repeater donor unit 200 (that is, radiation pattern produced by its modular donor antenna component 210) will include a main lobe 622 (or main beam) and a plurality of sidelobes 623.

An overlap between sidelobes 613 and 623 can reduce the isolation between a repeater donor unit 200 and a repeater access point 300, with a greater overlap producing greater leakage. In other words, even when a modular coverage antenna component 310 is selected to produce a narrowly defined main beam 612 directed into a desired coverage area, sidelobes 613 will still be produced close to the repeater access point 300 which can be received via sidelobes 623 of the modular donor antenna component 210 of the repeater donor unit 200. Similarly, sidelobes 623 produced close to the repeater donor unit 200 can be received via sidelobes 613 of the modular coverage antenna component 310 of the repeater access point 300.

In one embodiment, hybrid sidelobe mitigation involves adjusting and steering of the sidelobes 613 and/or 623 electronically to help maximize downlink signal isolation for a mmWave repeater 150. Because the modular coverage antenna component 310 comprises a phased array or antennas, adjustments to its pattern can be applied that can produce substantial changes to the size, directionality, and angles, of the sidelobes 613 while still providing a main beam 612 that produces the desired signal levels in the target coverage area. In one embodiment, the modular donor controller 240 includes at least one digital signal processing software algorithm that analyzes isolation leakage received from a sidelobe 613 and from that leakage data determines a radiation pattern adjustment.

In one embodiment, the repeater access point 300 introduces a test signal into its downlink path that is radiated from the modular coverage antenna component 310. For example, the modular coverage signal conditioning component 320 may include a test signal generator to generate a downlink test signal, or the modular coverage controller 340 may generate and output a downlink test signal that is injected into the downlink path of the repeater access point 300 and radiated from the modular coverage antenna component 310. As an alternative, in some embodiments, the modular donor signal conditioning component 220 may include the test signal generator to generate the downlink test signal, or the modular donor controller 240 may generate and output a downlink test signal that is injected into the downlink path transmitted to repeater access point 300 and radiated from the modular coverage antenna component 310. In order to perform the analysis with the repeater 150 in service, the downlink test signal should be differentiable from downlink communication signals created by base station 100. In some embodiments, the downlink test signal may be a broadband signal, or a signal that is frequency adjustable during the analysis.

The radiated downlink test signal produced by the modular coverage antenna component 310 is received at the modular donor antenna component 210 of the repeater donor unit 200 (for example, via a sidelobe 623). The modular donor controller 240 receives and recognizes the downlink test signal from the downlink path of the repeater donor unit 200 and applies digital signal processing to determine the signal level of the test signal in the downlink path, which is an indication of the present amount of downlink signal isolation. The modular donor controller 240 analyzes isolation leakage caused by sidelobes 613 and 623 and from that leakage data determines a radiation pattern adjustment. In some embodiments, the modular donor controller 240 determines an adjustment to the radiation pattern to reduce or change the angle of the sidelobe 613 and/or 623 or null an overlap region between them. That radiation pattern adjustment may then be communicated to the modular coverage controller 340 of the repeater access point 300 to adjust its modular coverage antenna component 310 to produce the revised radiation pattern, to the modular donor controller 240 of the repeater donor unit 200 to adjust its modular donor antenna component 210 to produce the revised radiation pattern, or both. This process may be iteratively repeated to arrive an optimum radiation pattern adjustment that mitigates sidelobe 613 feedback into the repeater donor unit 200.

In some embodiments, the modular donor controller 240 may determine adjustments for the transmission radiation pattern of the modular coverage antenna component 310, the reception antenna pattern of the modular donor antenna component 210, or both. By iteratively adjusting the reception and transmission radiation patterns, the sidelobes 613 and/or sidelobes 623 can be changed. That is, they may be at least partially nulled or redirected to decrease overlap and increase the downlink path isolation between repeater donor unit 200 and the repeater access point 300.

Hybrid sidelobe mitigation can similarly be employed to increase isolation between the repeater donor unit 200 and the repeater access point 300 with respect to uplink communications. In other words, even when a modular donor antenna component 210 is selected to produce a narrowly defined main beam 622 directed to a base station 100, sidelobes 623 will still be produced close to the repeater donor unit 200 which can lead to a signal leakage by overlapping the sidelobes 613 of the modular coverage antenna component 310 of the repeater access point 300. In the same manner as used for downlink signal isolation, hybrid sidelobe mitigation can again be employed to adjust and steer the sidelobes 623 and/or sidelobes 613 electronically to help maximize uplink signal isolation for a mmWave repeater 150.

As such, in one embodiment, hybrid sidelobe mitigation involves adjusting and steering of the sidelobes 623 and/or 613 electronically to help maximize uplink signal isolation for a mmWave repeater 150. Because the modular donor antenna component 210 comprises a phased array or antennas, adjustments to its pattern can be applied that can produce substantial changes to the size, directionality, and angles, of the sidelobes 623 while still providing a main beam 622 that produces the desired signal levels in the target coverage area.

In one embodiment, the modular coverage controller 340 includes at least one digital signal processing software algorithm that analyzes isolation leakage received from the modular coverage antenna component 310 and from that leakage data determines a radiation pattern adjustment. For example, the repeater donor unit 200 may introduce a test signal into its uplink path that is radiated from the modular donor antenna component 210. For example, the modular donor signal conditioning component 220 may include a test signal generator to generate an uplink test signal, or the modular donor controller 240 may generate and output an uplink test signal that is injected into the uplink path of the repeater donor unit 200. As an alternative, in some embodiments, the modular coverage signal conditioning component 320 may include the test signal generator to generate the uplink test signal, or the modular coverage controller 340 may generate and output an uplink test signal that is injected into the uplink path transmitted to repeater donor unit 200 and radiated from the modular donor antenna component 210. In order to perform the analysis with the repeater 150 in service, the uplink test signal should be differentiable from uplink communication signals created by UE 115. In some embodiments, the uplink test signal may be a broadband signal, or a signal that is frequency adjustable during the analysis.

The uplink test signal is radiated in the sidelobe 623 produced by the modular donor antenna component 210, and is received at the modular coverage antenna component 310 of the repeater access point 300. The modular coverage controller 340 receives and recognizes the uplink test signal from the uplink path of the repeater access point 300 and applies digital signal processing to determine the signal level of the test signal in the uplink path, which is an indication of the present amount of uplink signal isolation. The modular coverage controller 340 analyzes isolation leakage caused by sidelobes 613 and 623 and from that leakage data determines a radiation pattern adjustment. In some embodiments, the modular coverage controller 340 determines an adjustment to the radiation pattern to reduce or change the angle of the sidelobe 613 and/or 623 or null an overlap region between them. That radiation pattern adjustment may then be communicated to the modular donor controller 240 of the repeater donor unit 200 to adjust its modular donor antenna component 210 to produce the revised radiation pattern, to the modular coverage controller 340 of the repeater access point 300 to adjust its modular coverage antenna component 310 to produce the revised radiation pattern, or both. This process may be iteratively repeated to arrive at an optimum radiation pattern adjustment that mitigates sidelobe 623 feedback into the repeater access point 300.

In some embodiments, the modular coverage controller 340 may determine adjustments for the transmission radiation pattern of the modular donor antenna component 210, the reception antenna pattern of the modular coverage antenna component 310, or both. By iteratively adjusting the reception and transmission radiation patterns, the sidelobes 613 and/or sidelobes 623 can be changed. That is, they may be at least partially nulled or redirected to decrease overlap and increase the downlink path isolation between repeater donor unit 200 and the repeater access point 300.

In some embodiments, the modular controllers 240 and 340 may periodically execute hybrid sidelobe mitigation to account for changes in the surrounding environment around the repeater 150, or hybrid sidelobe mitigation can be remotely initiated by the repeater 150 system operator. In some embodiments, hybrid sidelobe mitigation as described above can be employed in conjunction with other uplink and downlink feedback isolation methods, such as but not limited to active echo cancellation.

For example, in still other embodiments, Received Signal Strength Indicator (RSSI) measurements may be utilized instead of injecting a test signal, or in addition to injection a test signal. The main lobe 622 of the repeater donor unit 200 would be initially adjusted to obtain the best signal quality with the next upstream device (whether the base station 100 or the remote cascade unit 400 of an upstream repeater 150). The modular coverage controller 340 of the repeater access point 300 would then execute an RSSI measurement with the repeater donor unit 200 switched off in order to determine the baseline undisturbed conditions. In cases where noise power is utilized instead of a test signal to determine leakage, to get a comparable result a fixed attenuator with a bypass function can be used in front of the detector. The attenuation value should be equal to the difference between maximum signal and noise power.

The repeater donor unit 200 is then switched back on and set to its maximum gain while the modular coverage controller 340 of the repeater access point 300 obtains another RSSI measurement, and calculates the RSSI delta based on the difference between those two RSSI measurements. When the RSSI delta exceeds a first threshold, X, of acceptability, the modular donor controller 240 will begin to adjust the modular donor antenna component 210 to vary the main lobe 622 direction and/or gain. In one embodiment, the modular donor controller 240 will adjust the azimuth and elevation angle of the main lobe 622 in small steps until the RSSI delta is below a second threshold, Y, (where Y is less than X) while measuring in parallel the RSSI level from the received signal to stay above a minimum third threshold, Z. If a predefined threshold could not be reached, the best achieved value shall be used instead. In some embodiments, the X, Y and Z thresholds may be expressed in term of received signal power in decibels. It should be understood that the signal for obtaining RSSI measurements comes from the next upstream device (whether the base station 100 or the remote cascade unit 400 of an upstream repeater 150) and that meeting the threshold Z has a higher priority since doing so ensures a sufficient connection quality is maintained between the repeater 150 and next upstream device. For example, the RSSI measurement can done on the repeater donor unit 200 and compared with threshold Z while the RSSI measurement result measured at the repeater access point 300 is compared with threshold X and Y.

Once repeater donor unit 200, main beam 622 is adjusted for maximum isolation, this same process can be repeated in the opposite direction to ensure enough reverse isolation. The main lobe 612 of the repeater access point 300 would be initially adjusted to obtain the best signal quality to communicate with UE 115 in the target coverage area. The modular donor controller 240 of the repeater donor unit 200 would then execute an RSSI measurement with the repeater access point 300 switched off in order to determine the baseline undisturbed conditions. The repeater access point 300 is then switched back on and set to its maximum gain while the modular donor controller 240 of the repeater donor unit 200 obtains another RSSI measurement, and calculates the RSSI delta based on the difference between those two RSSI measurements. When that RSSI delta exceeds a first threshold, X, of acceptability, the modular coverage controller 340 will begin to adjust the modular coverage antenna component 310 to vary the main lobe 612 direction and/or gain. In one embodiment, the modular coverage controller 340 will adjust the azimuth and elevation angle of the main lobe 612 in small steps until the RSSI delta is below a second threshold, Y, (where Y is less than X) while measuring in parallel the RSSI level from the received signal to stay above a minimum third threshold, Z. If a predefined threshold could not be reached, the best achieved value shall be used instead. In some embodiments, the X, Y and Z thresholds may again be expressed in term of received signal power in decibels.

As it would be appreciated by one skilled in the art who has studied this disclosure, depending on the given deployment environment, there may exist multiple installation locations available where the components of a repeater can be physically placed to facilitate expanding a coverage area into a desired area. Other embodiments therefor are disclosed below for determining the location with the best coverage conditions for both the repeater donor unit 200 connection towards the serving base station 100, and the repeater access point 300 link to the UE 115.

Figure 7:
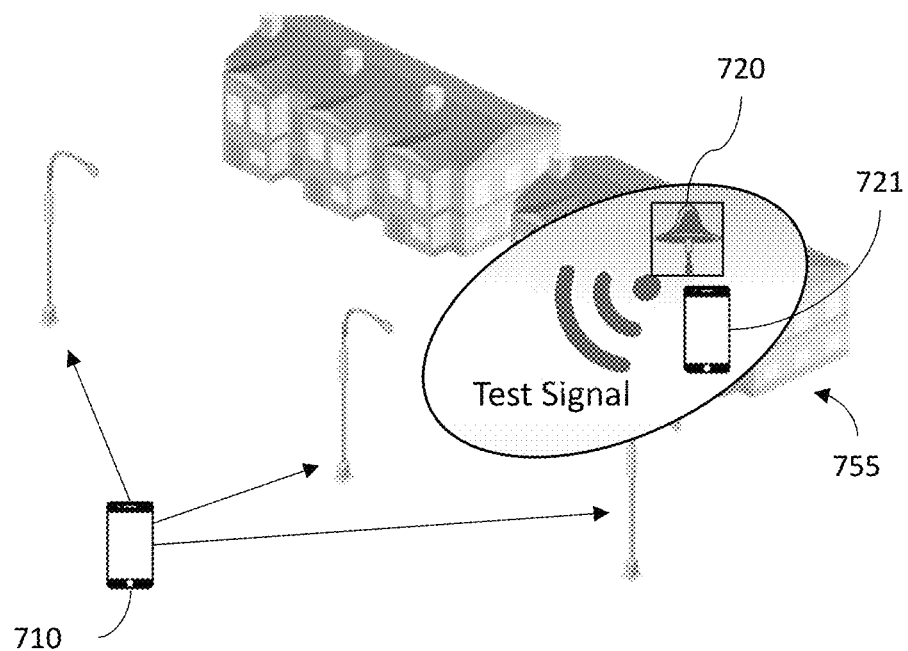
FIG. 7 is a diagram illustrating an example embodiment of a mobile computer device configured to facilitate repeater deployment position determinations and coverage zone localizations.

In some embodiments, a mobile computer device, such as a smartphone or tablet for example, may be utilized to facilitate repeater deployment position determinations and coverage zone localization. FIG. 7 illustrates the utilization of such a mobile computer device 710. The mobile computer device 710 may comprise a processor coupled to a memory, where one or more software applications are executed by the processor to implement the embodiments discussed herein. In one embodiment, the mobile computer device 710 includes a radio frequency transceiver and executes a base station scanner tool to decode signals transmitted by the base station 100 and received by the radio frequency transceiver. These base station signals may be analyzed to determine parameters such as received signal strength, signal to noise ratio, cell identifier, etc. Obtaining this information helps to compare possible installation locations before starting any mounting efforts. In one embodiment, the base station scanner tool is programmed with information regarding a repeater's radiation pattern capabilities, so that the actual base station downlink signal quality that would be observed by a repeater 150 can be derived mathematically and indicated in a simulation displayed on a screen of the mobile computer device 710.

The mobile computer device 710 may also comprise and execute one or more coverage zone optimization applications. To optimize the signal received by the repeater access point 300 for pre-defined areas (for example, buildings, rooms or floors) of the coverage zone, a test signal transmitter 720 located at a place of interest, such as a potential repeater coverage zone, that will have UE 115 devices present (at customer premises 755, for example) can be used in collaboration with the mobile computer device 710. The received signal quality at potential repeater access point 300 locations can be evaluated and compared to each other to select which location is optimum. Due to the reciprocity of Time Division Duplexed (TDD) channels, the location selection not only represents the optimum choice for uplink signals transmitted by the UE 115, but also for the downlink signals transmitted by the repeater 150 repeater access point 300. In some embodiments, the test signal transmitter 720 can be integrated within a stand-alone device, but can also be a built-in feature in mmWave CPEs (Customer Premises Equipment) of the mmWave repeater supplier. For example, a test signal transmitter 720 integrated into a CPE device or mobile computer device 721 that transmits a proprietary test signal, or a non-proprietary test signal, recognizable to the mobile computer device 710. Alternatively, the test signal transmitter 720 could be implemented as functionality within another mobile computer device 721. The second mobile computer device 721 may utilize the device's transmitter and execute a software application to send test signals towards the first mobile computer device 710, which is being operated in receive mode. In other embodiments, by optionally decoding a RACH (Random Access Channel) or a proprietary protocol (vendor specific) the location of existing customer premise location can be detected, information from which can be further utilized for coverage zone optimization. Based on a customer database, a coverage zone established by a repeater 150 can be adjusted, for example, to support prioritized customers with a premium contract. This is done by focusing the main beam 612 from the repeater access point 300 towards the selected customer premise equipment to increase the associated signal-to-interference-plus-noise ratio (SINR) and thus enable faster data rates. Feedback information from the customer premise equipment can also be read and utilized by the mobile computer device 710 to determine the appropriate transmit power of the repeater access point 300. For example, to penetrate a signal into buildings with low-e glass windows, a higher output power is necessary as compared to buildings that have regular glass windows. This feature can be beneficial to reduce the power consumption and the radiated power of the repeater 150. By limiting the radiated power it can be possible to maintain certain Maximum Power Exposure (MPE) requirements (for example, as dictated by government regulators or by others). In one embodiment with a simplest realization, the test signal transmitter 720's radiation pattern is omni-directional to fade out any effect of the (unknown and) variable end-user device radiation pattern.

By combining base station signal quality detection with coverage zone optimization and performing those processes with a mobile computer device 710 at the same time, it is possible to find the optimum installation position with respect to the best connection between the base station 100 and the repeater donor unit 200 as well as the connection between the UE 115 and the repeater access point(s) 300.

Figure 8:
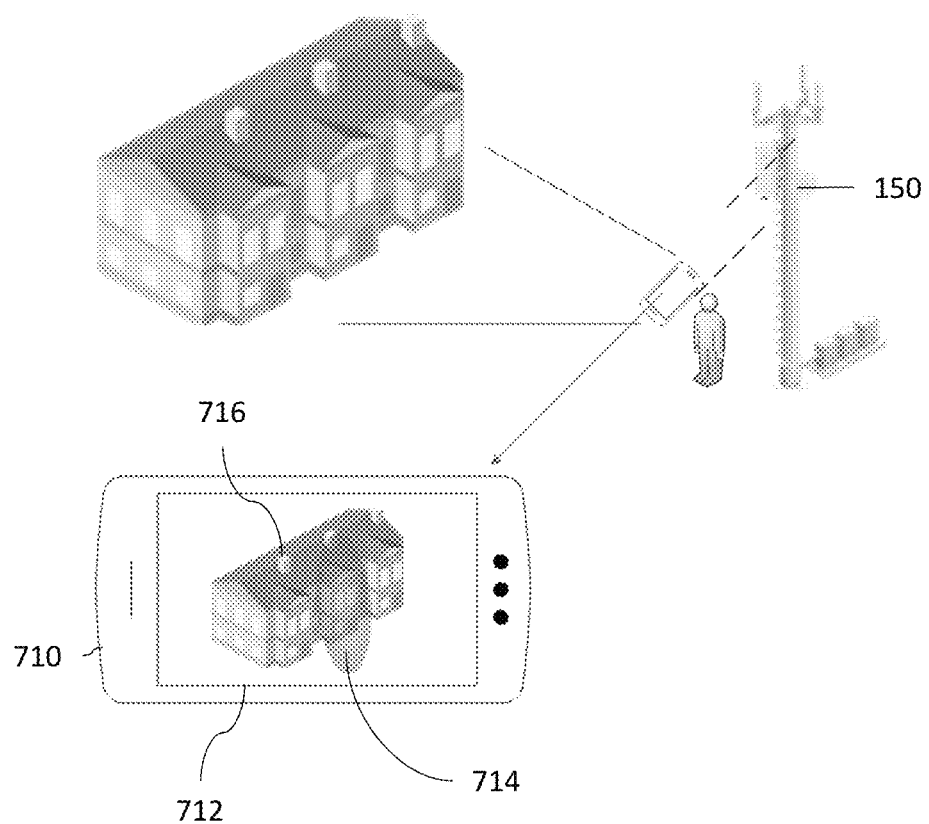
FIGS. 8 and 8A are diagrams illustrating an example embodiments of a mobile computer device that displays virtual illustrations of repeater coverage areas.

In some embodiments, one or more applications executed by the mobile computer device 710 have the capability to communicate with an installed repeater 150, (for example via Bluetooth or WiFi network link with one or both of the modular controllers 240, 340 of the repeater 150). In one embodiment, as shown in FIG. 8, an application executed by the mobile computer device 710 during the installation and commissioning process of a repeater (or alternately to make readjustments when the repeater is in an operational mode) may present a virtual illustration 714 of the repeater's radiation pattern to the user of the mobile computer device 710. For example, the virtual illustration 714 may be displayed via a graphical user interface (GUI) 712 of the mobile computer device 710, via a wearable Virtual Reality (VR) or augmented reality (AR) display device (such as VR/AR glasses, a VR/AR visor or a VR/AR headset) or on a computer. The virtual illustration 714 may be overlaid over an image (such a live video, photograph, or other visual representation) of the customer premise 716 to be served by the repeater 150. The virtual illustration 714 of the coverage area may be determined by the mobile computer device 710 from information on antenna array settings provided by the repeater 150. For example, the distance between a repeater and the customer premise and relative height information may be utilized to display a coverage zone with correct dimensions. Information in the antenna array settings provided by the repeater may include one or more of antenna radiation pattern, gain, and orientation information as well as geographic information containing geographic coordinates or similar information about the location of the repeater's antenna and/or orientation of its antenna pattern. This feature is especially helpful when providing coverage for a multi-dwelling unit and where the installer is interested in confirming the areas covered by the repeater 150 installation, or for other purposes. For example, once the coverage zone is displayed, the installer can move and resize the coverage zone via touch-screen drag and drop and multi-gesture controls, for example utilizing the GUI 712 of the mobile computer device 710. Such touch-screen controls make the adjustment of the coverage area very easy also for relatively less experienced technicians. For example, in one embodiment, an application executed by the mobile computer device 710 is configured to receive input from a user through the graphical user interface 712 via touch-screen drag and drop and multi-gesture controls. The application is configured to generate adjustment information to adjust the coverage area of the at least one radiation pattern in response to the touch-screen drag and drop and multi-gesture controls. In response, the application causes the mobile computer device 710 to send commands to the repeater to adjust its coverage area. The repeater 150 is configured to adjust its coverage antenna pattern in response to the commands.

Figure 8A:
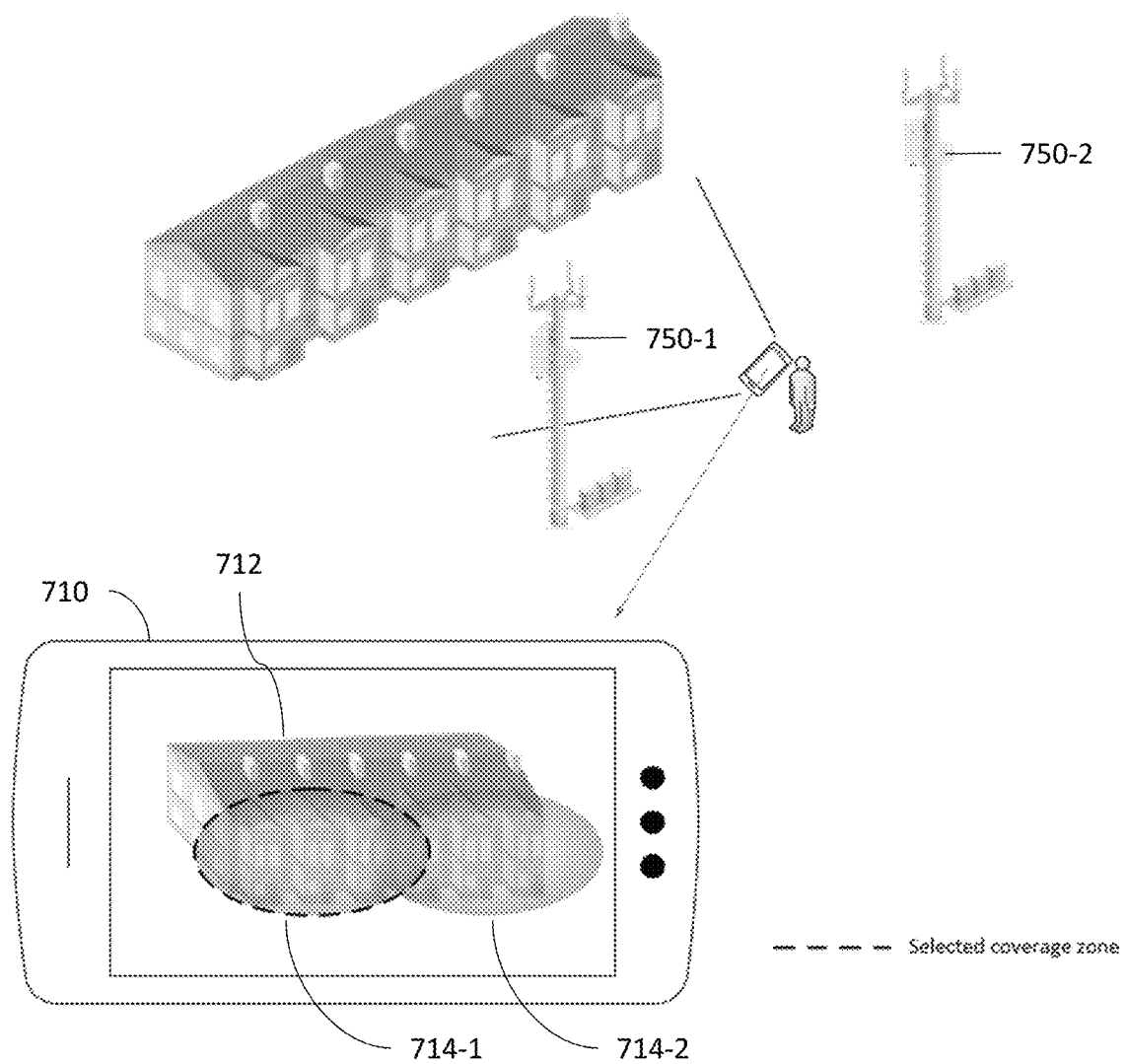

FIG. 8A, illustrates a repeater network that includes more than one repeater 150. Specifically for this example, the network includes a first repeater shown at 750-1 and a second repeater shown at 750-2. Other embodiments may include additional repeaters. For such an embodiment, the coverage zones 714-1 and 714-2 formed by the multiple repeater units may optionally be displayed on the GUI 712 of the mobile computer device 710 using augmented reality. For example, the GUI 712 may illustrate a coverage zone 714-1 associated with repeater 750-1 and a coverage zone 714-2 associated with repeater 750-2. In this way overlapping regions of two or more coverage zones can be observed utilizing the mobile computer device 710 and adjusted.

In some embodiments, in a multiuser scenario where a repeater 150 receives timing information from its base station 100, an individual coverage zone for each time frame can be adjusted as described in U.S. Provisional Patent Application No. 62/889,830 titled "COVERAGE ENHANCEMENT FOR DISTRIBUTED ANTENNA SYSTEMS AND REPEATERS BY TIME-DIVISION BEAMFORMING" and filed Aug. 21, 2019, which is included herein by reference in its entirety. Optionally, another mobile computer device 710 may include a camera that can be used to generate a view of the region to be covered from the point of view of the repeater access point 300 (e.g., it can be placed in a holder that is mounted on each repeater access point 300). The augmented image with the projected coverage area may then be communicated back to the mobile computer device 710 where it can be observed by the installer. In some embodiments, instead of using the second computer device 710, a repeater access point 300 may further include an integrated camera (for example, integrated into the modular coverage antenna component 310) that is used to generate the data for the visualization. By using a camera with two lenses, the distance between the repeater access point 300 and the object to be covered can also be determined. In still other embodiments, a repeater access point 300 may comprise an integrated RADAR or LiDAR that detects obstacles reflecting parts of the transmitted signals that effect the coverage zone. Such measurements can be repeated to detect changing environment conditions. For example, a tree with and without leaves during summer and winter time can be detected.

As previously discussed above, one or each of the modular controllers 240, 340, 440 of a repeater 150 can comprise a modem or network interface that permits remote user access to the functions of the modular controller from via an external network. These external access interfaces allow their respective controllers to be accessible remotely for Operation, Administration and Maintenance (OAM) purposes and to set up a repeater network. Beside state-of-the-art network features similar to the one provided by Network Management Systems (NMS) like CommScope's AIMOS, in some embodiments, additional artificial intelligence is added to the repeater network to implement automatic group delay regulation and/or automatic group delay minimization.

Figure 9:
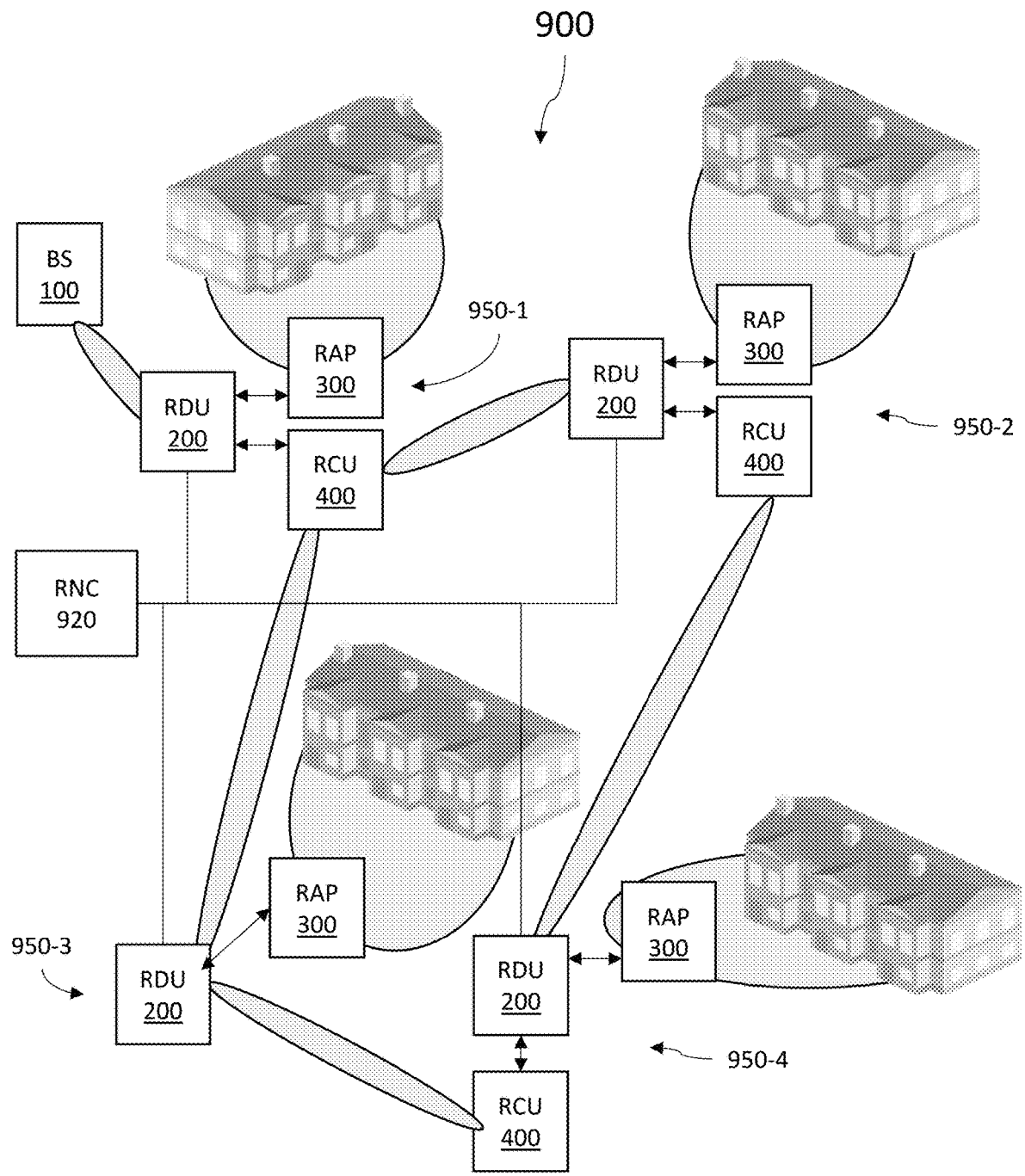
FIG. 9 is a diagram illustrating an example embodiment of a mmWave repeater network configured to optimize repeater group delay.

As discussed above, in many use-cases multiple instances of the mmWave repeater 150 may be installed near each other. For instance, several repeaters may receive a common donor signal from the serving base station 100 and generate a common large coverage area. FIG. 9 illustrates such a repeater network 900 comprising a plurality of mmWave repeaters (shown as 950-1, 950-2, 950-3 and 950-4). In the example network 900, the repeaters 950-1, 950-2, 950-3 and 950-4 are installed in a multi-hop manner where a downlink transmit signal from one repeater's repeater cascade unit 400 may feed the repeater donor unit 200 for the next consecutive repeater. Other examples of similar configurations are shown in FIGS. 4 and 5. For regular CP-OFDM (Cyclic Prefix Orthogonal Frequency Division Multiplex) modulated communications systems like 4G and 5G, one challenge faced in such cascading repeater networks is the group delay of the repeaters which can result in a reduced signal-to-noise ratio (SNR) and lower throughput for the UE 115. In one embodiment, to address this problem the mmWave repeaters 950-1, 950-2, 950-3 and 950-4 may comprise a group delay adoption algorithm that may be executed by their respective modular controllers 240, 340, and/or 440. Through this group delay adoption algorithm, "site data" is shared between the repeaters within the network 900, the group delay situation can be modelled inside the repeaters 950-1, 950-2, 950-3 and 950-4 and the individual group delay is regulated automatically by each repeater to minimize the multipath channel. In some embodiments, the site data communicated between repeaters 950-1, 950-2, 950-3 and 950-4 of the network 900 may comprise, for example, location information (for example, Global Navigation Satellite System (GNSS) determined location coordinates), repeater donor unit, repeater access point, and/or repeater cascade unit antenna radiation patterns, group delay settings, etc. The site data is then processed by the group delay adoption algorithm to optimize the network performance automatically and individually adjust a repeater's group delay for the given scenario. In some embodiments, group delay adjustments are performed by one or more analog delay elements added to the uplink and/or downlink paths of the repeater access points 300 (for example, to the uplink or downlink signal paths of the modular signal conditioning component 320). By having the delay elements within the repeater access points 300 instead of the repeater donor units 200, higher flexibility is given for repeaters that comprise multiple repeater access points 300. The location information can be used to set the default main beam direction from the repeater donor unit 200 towards the base station 100, which helps to accelerate the antenna alignment process.

In a multi-hop scenario, such as shown in FIG. 9, the network 900 may be configured such that a repeater donor unit 200 can receive donor signals from more than one repeater cascade unit 400 with nearly same signal quality. Each of these signals as received has a different group delay depending on the number of repeaters between base station 100 and that receiver. In one embodiment, to determine the received signal that has traveled through the fewest number of retransmission jumps, each repeater cascade unit 400 adds jump information to the signal it retransmits. In a simple implementation this jump information is a number. The repeater donor unit 200 checks whether the received donor signal contains such a number. If no number is present, the connected repeater cascade unit 400 retransmits that signal with the initial jump information having a value of 1 (indicating that the transmitted signal has passed through a repeater once). If a jump information value is present in a received donor signal, the connected repeater cascade unit 400 increments the jump information value by one when it retransmits that signal. In the example repeater network 900 illustrated in FIG. 9, the repeater donor unit 200 of the repeater 950-3 in the lower left corner receives two donor signals, one from the repeater 950-1 and one from the repeater 950-4. An automatic algorithm checks the received information and determines which of the two received donor signals has the lowest number to achieve the lowest possible group delay.

It is beneficial to know the overall delay experienced by the UE 115 services by each repeater in the network 900. In one embodiment, a delay management algorithm in each of the repeaters 950-1, 950-2, 950-3 and 950-4 can adjust analog delay elements in its respective signal paths based on the jump information, and synchronize the delays of each of the repeaters 950-1, 950-2, 950-3 and 950-4. The UE 115 will thus receive a signal from its respective repeater comprising the overlapping downlink signals, but the synchronization of the delays will ensure that signal quality will not be affected by large delay differences.

In some embodiments, depending on the network structure, it can be useful to implement a common delay for the entire network 900 instead of individual delays at each repeater. In this case the repeater access point experiencing the highest delay determines the delay that needs to be set for all other repeaters in the same network.

As also illustrated in FIG. 9, in some embodiments a repeater network server (RNS) 920 may be coupled by a network to the OAM functions of the modular controllers 240, 340, 440 to coordinate the jump information and/or share other information between the repeaters 950-1, 950-2, 950-3 and 950-4 to synchronize their delays and manage and/or minimize group delay or coordinate other repeater management activities.

It should be appreciated that other repeater network architectures may be implemented that still functionally operate in the same manner as described in any of the embodiments described herein.

EXAMPLE EMBODIMENTS

Example 1 includes an over-the-air millimeter wave repeater for a communications network, the repeater comprising: a repeater donor unit that includes a first plurality of modular electronic components; and a repeater access point coupled to the repeater donor unit, wherein the repeater access point includes a second plurality of modular electronic components; wherein the repeater donor unit communicates downlink millimeter wave spectrum wireless signals received from a base station to the repeater access point and radiates uplink millimeter wave spectrum wireless signals received from the repeater access point to the base station; wherein the access point radiates the downlink millimeter wave spectrum wireless signals received from the repeater donor unit into a coverage area, receives the uplink millimeter wave spectrum wireless signals received from the coverage area, and communicates the uplink millimeter wave spectrum wireless signals to the repeater donor unit; wherein the first plurality of modular electronic components includes at least one of a modular donor antenna component, a modular donor signal conditioning component, a modular donor signal interface component, and a modular donor controller; and wherein the second plurality of modular electronic components includes at least one of a modular coverage antenna component, a modular coverage signal conditioning component, a modular coverage signal interface component, and a modular coverage controller.

Example 2 includes the repeater of example 1, wherein the modular donor antenna component and the modular coverage antenna component each comprise an array of multiple spatially separated antennas.

Example 3 includes the repeater of example 2, wherein a directionality of the modular donor antenna is controlled by the modular donor controller or by the modular coverage controller by adjusting a phase and a relative amplitude of a signal transmitted from each of the multiple spatially separated antennas of the modular donor antenna.

Example 4 includes the repeater of any of examples 2-3, wherein a directionality of the modular coverage antenna is controlled by the modular coverage controller or by the modular donor controller by adjusting a phase and a relative amplitude of a signal transmitted from each of the multiple spatially separated antennas of the modular coverage antenna.

Example 5 includes the repeater of any of examples 1-4, wherein the modular donor signal conditioning component comprises an uplink path and a downlink path for transporting communications between the modular donor antenna component and the modular donor signal interface; wherein the modular coverage signal conditioning component comprises an uplink path and downlink path for transporting communications between the modular coverage antenna component and the modular coverage signal interface; wherein the modular donor signal interface is communicatively coupled to the modular coverage signal interface by a communications medium.

Example 6 includes the repeater of example 5, wherein the modular donor signal interface is communicatively coupled to the modular coverage signal interface by one of a wired communications media, a fiber optic communications media, or a wireless communications media.

Example 7 includes the repeater of any of examples 1-6, further comprising: a repeater cascade unit coupled to one or both of the repeater donor unit or the repeater access point; wherein either the repeater access point or the repeater cascade unit is configured to radiate the downlink millimeter wave spectrum wireless signals received from the repeater donor unit into a second repeater; wherein either the repeater access point or the repeater cascade unit is configured to receive cascaded uplink millimeter wave spectrum wireless signals from the second repeater and communicate the uplink wave spectrum wireless signals millimeter wave spectrum wireless signals to the repeater donor unit.

Example 8 includes the repeater of example 7, wherein the repeater cascade unit includes a first plurality of modular electronic components that includes at least one of a modular cascade antenna component, a modular cascade signal conditioning component, a modular cascade signal interface component, and a modular cascade controller.

Example 9 includes the repeater of any one of examples 1-8, wherein the modular donor controller is configured to: analyze an isolation leakage signal received by modular donor antenna component from a sidelobe of a radiation pattern transmitted by the modular coverage antenna component to obtain leakage data; determine a radiation pattern adjustment based on the leakage data; and adjust the radiation pattern of the modular coverage antenna component to reduce the isolation leakage signal received from the sidelobe.

Example 10 includes the repeater of example 9, wherein the isolation leakage signal received by modular donor antenna component is reflected by an obstacle in the coverage area.

Example 11 includes the repeater of any of examples 9-10, wherein the modular donor controller communicates a radiation pattern adjustment to the modular coverage controller to adjust the modular coverage antenna component to a revised radiation pattern.

Example 12 includes the repeater of any of examples 9-11, wherein the modular coverage antenna component transmits a test signal to produce the isolation leakage signal analyzed by the modular donor controller.

Example 13 includes the repeater of any of examples 9-13, wherein the modular donor controller performs Received Signal Strength Indicator (RSSI) measurements to analyze the leakage data.

Example 14 includes the repeater of any one of examples 1-13, wherein the modular coverage controller is configured to: analyze an isolation leakage signal received by modular coverage antenna component from a sidelobe of a radiation pattern transmitted by the modular donor antenna component to obtain leakage data; determine a radiation pattern adjustment based on the leakage data; and adjust the radiation pattern of the modular donor antenna component to reduce the isolation leakage signal received from the sidelobe.

Example 15 includes the repeater of example 14, wherein the isolation leakage signal received by modular coverage antenna component is reflected by an obstacle in the coverage area.

Example 16 includes the repeater of any of examples 14-15, wherein the modular coverage controller communicates a radiation pattern adjustment to the modular donor controller to adjust the modular donor antenna component to a revised radiation pattern.

Example 17 includes the repeater of any of examples 14-16, wherein the modular donor antenna component transmits a test signal to produce the isolation leakage signal analyzed by the modular coverage controller.

Example 18 includes the repeater of any of examples 13-17, wherein the modular coverage controller performs Received Signal Strength Indicator (RSSI) measurements to analyze the leakage data.

Example 19 includes a repeater network comprising a plurality of the over-the-air millimeter wave repeaters of any of examples 1-18.

Example 20 includes the repeater network of example 19, wherein each of the plurality of over-the-air millimeter wave repeaters is configured to execute a group delay algorithm that shares site data with the group delay algorithm of each of the other over-the-air millimeter wave repeaters; wherein the group delay adoption algorithm for each respective over-the-air millimeter wave repeater adjusts group delay based on the site data.

Example 21 includes the repeater network of example 20, wherein the site data comprises at least one of: repeater location information, antenna radiation patterns, or group delay settings.

Example 22 includes the repeater network of any of examples 20-21, wherein the repeater access point for each of the plurality of over-the-air millimeter wave repeaters comprises one or more analog delay elements within one or both of an uplink path or downlink path of the repeater access point, wherein the group delay adoption algorithm adjusts the group delay utilizing the one or more analog delay elements.

Example 23 includes the repeater network of any of examples 20-22, wherein the group delay algorithm adjusts the one or more analog delay elements based on jump information.

Example 24 includes the repeater network of any of examples 20-23, further comprising a repeater network server in communication with each of the plurality of over-the-air millimeter wave repeaters and configured to share group delay synchronization between the plurality of over-the-air millimeter wave repeaters.

Example 25 includes a mobile computer device, the mobile computer device comprising: a processor coupled to a memory, wherein the memory stored information about at least one radiation pattern for at least one over-the-air millimeter wave repeater, wherein the at least one over-the-air millimeter wave repeater comprises a repeater donor unit coupled to at least one repeater access point, wherein the repeater donor unit communicates downlink millimeter wave spectrum wireless signals received from a base station to the repeater access point and radiates uplink millimeter wave spectrum wireless signals received from the repeater access point to the base station; and wherein the repeater access point radiates the downlink millimeter wave spectrum wireless signals received from the repeater donor unit into a coverage area, receives the uplink millimeter wave spectrum wireless signals from the coverage area, and communicates the uplink millimeter wave spectrum wireless signals to the repeater donor unit; a radio frequency transceiver configured to receive the downlink millimeter wave spectrum wireless signals received from the base station; wherein the processor executes an application that decodes the downlink millimeter wave spectrum wireless signals and based on the radiation pattern for the at least one over-the-air millimeter wave repeater, determines a base station downlink signal quality that would be observed by the at least one over-the-air millimeter wave repeater.

Example 26 includes the mobile computer device of example 25, further comprising: a radio frequency transceiver configured to receive a test signal from a test signal transmitter located at a potential coverage zone; wherein the processor executes an application that decodes the test signal to obtain received signal quality information for one or more potential locations for the at least one over-the-air millimeter wave repeater based on the signal quality information and the radiation pattern for the at least one over-the-air millimeter wave repeater.

Example 27 includes a Customer Premise Equipment (CPE) device for use with the mobile computer device of example 26, the CPE device comprising: the test signal transmitter, wherein the test signal transmitter is integrated within the CPE device and transmits either a proprietary or non-proprietary test signal recognizable to the application of the mobile computer device.

Example 28 includes the mobile computer device of example 25 or 26, further comprising: a radio frequency transceiver configured to communicate with the at least one over-the-air millimeter wave repeater; wherein the processor executes an application that presents a virtual illustration on a graphical user interface of the at least one radiation pattern overlaid on an image of customer premise covered by a coverage area of the at least one radiation pattern; wherein the virtual illustration is generated from information on antenna array settings provided by the at least one over-the-air millimeter wave repeater.

Example 29 includes the mobile computer device of example 28, wherein the application is configured to receive input from a user through the graphical user interface via touch-screen drag and drop and multi-gesture controls; wherein the application is configured to generate adjustment information to adjust the coverage area of the at least one radiation pattern in response to the touch-screen drag and drop and multi-gesture controls; wherein the application is configured to send commands to the at least one over-the-air millimeter wave repeater to adjust the coverage area of the at least one radiation pattern in response to the adjustment information; and wherein the at least one over-the-air millimeter wave repeater is configured to adjust the at least one radiation pattern of the at least one over-the-air millimeter wave repeater in response to the commands.

Example 30 includes the mobile computer device of example 28 or 29, wherein graphical user interface comprises one of: a display of the mobile computer device; a wearable virtual reality (VR) or augmented reality (AR) display device; or a computer in communication with the mobile computer device Example 31 includes the mobile computer device of any of examples 28-30, wherein the virtual illustration includes radiation patterns for coverage zones for more than one over-the-air millimeter wave repeater.

In various alternative embodiments, system and/or device elements, method steps, or example implementations described throughout this disclosure (such as any of the base stations, control units, distributed units, remote units, repeaters, repeater donor units, repeater access points, repeater cascade units, modular antenna components, modular controllers, modular signal conditioning components, modular signal interfaces, servers, circuits, or sub-parts of any thereof, for example) may be implemented at least in part using one or more computer systems, field programmable gate arrays (FPGAs), or similar devices comprising a processor coupled to a memory and executing code to realize those elements, processes, or example implementations, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, DAS and repeater system related terms such as base station, control unit, distributed unit, remote unit, repeaters, repeater donor unit, repeater access point, repeater cascade unit, modular antenna component, modular controller, modular signal conditioning components, modular signal interfaces, servers, circuits, refer to non-generic hardware device elements that would be immediately recognized and understood by those of skill in the art of wireless communications and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An over-the-air millimeter wave repeater for a communications network, the repeater comprising:
    a repeater donor unit that includes a first plurality of modular electronic components, wherein a modular electronic component is a self-contained component of hardware comprising electronics and circuits that form a subsystem that performs a designated function in conjunction with elements of a larger system within the repeater that can be installed and removed to provide the system within the repeater with a desired operational configuration; and
    a repeater access point coupled to the repeater donor unit, wherein the repeater access point includes a second plurality of modular electronic components;
    wherein the repeater donor unit communicates downlink millimeter wave spectrum wireless signals received from a base station to the repeater access point and radiates uplink millimeter wave spectrum wireless signals received from the repeater access point to the base station;
    wherein the repeater access point radiates the downlink millimeter wave spectrum wireless signals received from the repeater donor unit into a coverage area, receives the uplink millimeter wave spectrum wireless signals received from the coverage area, and communicates the uplink millimeter wave spectrum wireless signals to the repeater donor unit;
    wherein the first plurality of modular electronic components includes a modular donor antenna component and at least one of a modular donor signal conditioning component, a modular donor signal interface component, and a modular donor controller; and
    wherein the second plurality of modular electronic components includes a modular coverage antenna component and at least one of a modular coverage signal conditioning component, a modular coverage signal interface component, and a modular coverage controller.

2. The repeater of claim 1, wherein the modular donor antenna component and the modular coverage antenna component each comprise an array of multiple spatially separated antennas.

3. The repeater of claim 2, wherein a directionality of the modular donor antenna is controlled by the modular donor controller, or by the modular coverage controller, by adjusting a phase and a relative amplitude of a signal transmitted from each of the multiple spatially separated antennas of the modular donor antenna.

4. The repeater of claim 2, wherein a directionality of the modular coverage antenna is controlled by the modular coverage controller, or by the modular donor controller, by adjusting a phase and a relative amplitude of a signal transmitted from each of the multiple spatially separated antennas of the modular coverage antenna.

5. The repeater of claim 1, wherein the modular donor signal conditioning component comprises an uplink path and a downlink path for transporting communications between the modular donor antenna component and the modular donor signal interface;
    wherein the modular coverage signal conditioning component comprises an uplink path and downlink path for transporting communications between the modular coverage antenna component and the modular coverage signal interface; and
    wherein the modular donor signal interface is communicatively coupled to the modular coverage signal interface by a communications medium.

6. The repeater of claim 1, further comprising:
    a repeater cascade unit coupled to one or both of the repeater donor unit or the repeater access point;
    wherein either the repeater access point or the repeater cascade unit is configured to radiate the downlink millimeter wave spectrum wireless signals received from the repeater donor unit into a second repeater; and
    wherein either the repeater access point or the repeater cascade unit is configured to receive cascaded uplink millimeter wave spectrum wireless signals from the second repeater and communicate the uplink millimeter wave spectrum wireless signals to the repeater donor unit;
    wherein the repeater cascade unit includes a first plurality of modular electronic components that includes at least one of a modular cascade antenna component, a modular cascade signal conditioning component, a modular cascade signal interface component, and a modular cascade controller.

7. The repeater of claim 1, wherein the modular donor controller is configured to:
    analyze an isolation leakage signal received by modular donor antenna component from a sidelobe of a radiation pattern transmitted by the modular coverage antenna component to obtain leakage data;
    determine a radiation pattern adjustment based on the leakage data; and
    adjust the radiation pattern of the modular coverage antenna component to reduce the isolation leakage signal received from the sidelobe.

8. The repeater of claim 1, wherein the modular coverage controller is configured to:
- analyze an isolation leakage signal received by modular coverage antenna component from a sidelobe of a radiation pattern transmitted by the modular donor antenna component to obtain leakage data;
- determine a radiation pattern adjustment based on the leakage data; and
- adjust the radiation pattern of the modular donor antenna component to reduce the isolation leakage signal received from the sidelobe.

9. A repeater network, the network comprising:
- a plurality of the over-the-air millimeter wave repeaters, wherein one or more of the plurality of the over-the-air millimeter wave repeaters comprises:
  - a repeater donor unit that includes a first plurality of modular electronic components, wherein a modular electronic component is a self-contained component of hardware comprising electronics and circuits that form a subsystem that performs a designated function in conjunction with elements of a larger system within the one or more over-the-air-millimeter wave repeater that can be installed and removed to provide the larger system within the one or more over-the-air-millimeter wave repeater with a desired operational configuration; and
  - a repeater access point coupled to the repeater donor unit, wherein the repeater access point includes a second plurality of modular electronic components;
  - wherein the repeater donor unit communicates downlink millimeter wave spectrum wireless signals received from a base station to the repeater access point and radiates uplink millimeter wave spectrum wireless signals received from the repeater access point to the base station;
  - wherein the access point radiates the downlink millimeter wave spectrum wireless signals received from the repeater donor unit into a coverage area, receives the uplink millimeter wave spectrum wireless signals received from the coverage area, and communicates the uplink millimeter wave spectrum wireless signals to the repeater donor unit;
  - wherein the first plurality of modular electronic components includes a modular donor antenna component and at least one of a modular donor signal conditioning component, a modular donor signal interface component, and a modular donor controller; and
  - wherein the second plurality of modular electronic components includes a modular coverage antenna component and at least one of a modular coverage signal conditioning component, a modular coverage signal interface component, and a modular coverage controller.

10. The repeater network of claim 9, wherein each of the plurality of over-the-air millimeter wave repeaters is configured to execute a group delay algorithm that shares site data with the group delay algorithm of each of the other over-the-air millimeter wave repeaters;
- wherein the group delay adoption algorithm for each respective over-the-air millimeter wave repeater adjusts group delay based on the site data.

11. The repeater network of claim 10, wherein the site data comprises at least one of:
- repeater location information, antenna radiation patterns, or group delay settings.

12. The repeater network of claim 10, wherein the repeater access point for each of the plurality of over-the-air millimeter wave repeaters comprises one or more analog delay elements within one or both of an uplink path or downlink path of the repeater access point, wherein the group delay adoption algorithm adjusts the group delay utilizing the one or more analog delay elements.

13. The repeater network of claim 12, wherein the group delay algorithm adjusts the one or more analog delay elements based on jump information.

14. The repeater network of claim 13, further comprising a repeater network server in communication with each of the plurality of over-the-air millimeter wave repeaters and configured to share group delay synchronization between the plurality of over-the-air millimeter wave repeaters.

15. A mobile computer device, the mobile computer device comprising:
- a processor coupled to a memory, wherein the memory stored information about at least one radiation pattern for at least one over-the-air millimeter wave repeater in communication with the mobile computer device, wherein the at least one over-the-air millimeter wave repeater comprises a repeater donor unit coupled to at least one repeater access point, wherein the repeater donor unit communicates downlink millimeter wave spectrum wireless signals received from a base station to the repeater access point and radiates uplink millimeter wave spectrum wireless signals received from the repeater access point to the base station, and wherein the repeater access point radiates the downlink millimeter wave spectrum wireless signals received from the repeater donor unit into a coverage area, receives the uplink millimeter wave spectrum wireless signals from the coverage area, and communicates the uplink millimeter wave spectrum wireless signals to the repeater donor unit; and
- a radio frequency transceiver configured to receive the downlink millimeter wave spectrum wireless signals received from the base station;
- wherein the processor executes an application that decodes the downlink millimeter wave spectrum wireless signals and based on the radiation pattern for the at least one over-the-air millimeter wave repeater, determines a base station downlink signal quality that would be observed by the at least one over-the-air millimeter wave repeater when deployed near the mobile computer device.

16. The mobile computer device of claim 15, further comprising:
- a radio frequency transceiver configured to receive a test signal from a test signal transmitter located at a potential coverage zone;
- wherein the processor executes an application that decodes the test signal to obtain received signal quality information for one or more potential locations for the at least one over-the-air millimeter wave repeater based on the signal quality information and the radiation pattern for the at least one over-the-air millimeter wave repeater.

17. The mobile computer device of claim 15, further comprising:
- a radio frequency transceiver configured to communicate with the at least one over-the-air millimeter wave repeater;
- wherein the processor executes an application that presents a virtual illustration on a graphical user interface of the at least one radiation pattern overlaid on an image of customer premise covered by a coverage area of the at least one radiation pattern;

wherein the virtual illustration is generated from information on antenna array settings provided by the at least one over-the-air millimeter wave repeater.

18. The mobile computer device of claim 17, wherein the application is configured to receive input from a user through the graphical user interface via touch-screen drag and drop and multi-gesture controls;

wherein the application is configured to generate adjustment information to adjust the coverage area of the at least one radiation pattern in response to the touch-screen drag and drop and multi-gesture controls;

wherein the application is configured to send commands to the at least one over-the-air millimeter wave repeater to adjust the coverage area of the at least one radiation pattern in response to the adjustment information; and wherein the at least one over-the-air millimeter wave repeater is configured to adjust the at least one radiation pattern of the at least one over-the-air millimeter wave repeater in response to the commands.

19. The mobile computer device of claim 17 wherein the graphical user interface comprises one of:

a display of the mobile computer device;

a wearable virtual reality (VR) or augmented reality (AR) display device; or a computer in communication with the mobile computer device.

20. The mobile computer device of claim 17, wherein the virtual illustration includes radiation patterns for coverage zones for more than one over-the-air millimeter wave repeater.

\* \* \* \* \*